United States Patent
Rico Alvarino et al.

(10) Patent No.: US 11,956,753 B2
(45) Date of Patent: Apr. 9, 2024

(54) COMMON SEARCH SPACE FOR MACHINE TYPE COMMUNICATIONS

(71) Applicant: QUALCOMM Incorporated, San Diego, CA (US)

(72) Inventors: Alberto Rico Alvarino, San Diego, CA (US); Wanshi Chen, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/075,627

(22) Filed: Oct. 20, 2020

(65) Prior Publication Data

US 2022/0124670 A1 Apr. 21, 2022
US 2023/0029449 A9 Jan. 26, 2023

Related U.S. Application Data

(63) Continuation of application No. 16/195,338, filed on Nov. 19, 2018, now Pat. No. 10,820,177, which is a
(Continued)

(51) Int. Cl.
*H04W 68/00* (2009.01)
*H04W 4/70* (2018.01)
(Continued)

(52) U.S. Cl.
CPC ........... *H04W 68/005* (2013.01); *H04W 4/70* (2018.02); *H04W 4/80* (2018.02); *H04W 72/0453* (2013.01); *H04W 72/23* (2023.01)

(58) Field of Classification Search
CPC ....... H04W 68/005; H04W 4/70; H04W 4/80; H04W 72/042; H04W 72/0453
(Continued)

(56) References Cited

U.S. PATENT DOCUMENTS 9,538,502 B2 1/2017 Chen et al.
9,572,063 B2 2/2017 Etemad et al.
(Continued)

FOREIGN PATENT DOCUMENTS

CN 103220811 A 7/2013
CN 103907325 A 7/2014
(Continued)

OTHER PUBLICATIONS

European Search Report—EP19160985—Search Authority—The Hague—dated Jul. 8, 2019.
(Continued)

*Primary Examiner* — Mark G. Pannell
(74) *Attorney, Agent, or Firm* — Patterson + Sheridan, L.L.P.

(57) ABSTRACT

Certain aspects of the present disclosure generally relate to wireless communications and more specifically to search space configuration in systems utilizing devices with limited communications resources, such as machine type communication (MTC) devices and enhanced MTC (eMTC) devices. An example method generally includes receiving a physical random access channel (PRACH) signal from a first user equipment (UE) on a first narrowband region within a wider system bandwidth and transmitting, in response to the PRACH signal, a random access response (RAR) signal in a first search space in a second narrowband region in at least a first subframe.

12 Claims, 15 Drawing Sheets

Related U.S. Application Data continuation of application No. 15/174,678, filed on Jun. 6, 2016, now Pat. No. 10,165,423.

(60) Provisional application No. 62/288,425, filed on Jan. 28, 2016, provisional application No. 62/191,253, filed on Jul. 10, 2015.

(51) Int. Cl.
    *H04W 4/80*         (2018.01)
    *H04W 72/0453*    (2023.01)
    *H04W 72/23*       (2023.01)

(58) Field of Classification Search
    USPC .......................................................... 370/329
    See application file for complete search history.

(56) References Cited

U.S. PATENT DOCUMENTS

| | | | |
|---|---|---|---|
| 9,635,705 B2 | 4/2017 | Lu et al. | |
| 10,165,423 B2 | 12/2018 | Rico Alvarino et al. | |
| 10,820,177 B2 | 10/2020 | Rico Alvarino et al. | |
| 2009/0176514 A1* | 7/2009 | Choi | H04W 68/02 455/458 |
| 2010/0067496 A1* | 3/2010 | Choi | H04W 52/54 370/336 |
| 2011/0317627 A1* | 12/2011 | Kato | H04L 5/0098 370/328 |
| 2013/0083749 A1 | 4/2013 | Xu et al. | |
| 2014/0071936 A1 | 3/2014 | Zhang et al. | |
| 2014/0098761 A1 | 4/2014 | Lee et al. | |
| 2015/0016312 A1 | 1/2015 | Li et al. | |
| 2015/0181576 A1* | 6/2015 | Papasakellariou | H04L 1/0072 370/329 |
| 2015/0257173 A1 | 9/2015 | You et al. | |
| 2016/0044740 A1* | 2/2016 | Siomina | H04W 76/14 455/552.1 |
| 2016/0135141 A1* | 5/2016 | Burbidge | H04W 68/02 455/458 |
| 2016/0270057 A1 | 9/2016 | Yu et al. | |
| 2016/0309282 A1* | 10/2016 | Xu | H04W 72/042 |
| 2017/0034870 A1* | 2/2017 | Uchino | H04W 52/0216 |
| 2017/0127381 A1* | 5/2017 | Yavus | H04W 68/025 |
| 2017/0244529 A1* | 8/2017 | Yu | H04W 76/15 |
| 2017/0280481 A1* | 9/2017 | Stern-Berkowitz | H04L 1/1854 |
| 2017/0289965 A1* | 10/2017 | You | H04W 72/042 |
| 2017/0311284 A1* | 10/2017 | Basu Mallick | H04W 68/02 |
| 2017/0339667 A1* | 11/2017 | Shen | H04W 76/27 |
| 2018/0007733 A1* | 1/2018 | Mochizuki | H04W 48/16 |
| 2018/0092062 A1* | 3/2018 | Chen | H04W 68/00 |
| 2018/0183485 A1* | 6/2018 | Bontu | H04B 1/44 |
| 2018/0227880 A1* | 8/2018 | Su | H04W 68/02 |
| 2018/0270634 A1* | 9/2018 | Kim | H04W 4/70 |
| 2021/0329553 A1* | 10/2021 | Åström | H04W 4/80 |

FOREIGN PATENT DOCUMENTS

| | | |
|---|---|---|
| CN | 104067583 A | 9/2014 |
| JP | 2011120190 A | 6/2011 |
| JP | 2015526962 A | 9/2015 |
| JP | 2016506210 A | 2/2016 |
| WO | 2013166104 | 11/2013 |
| WO | 2014003436 A1 | 1/2014 |
| WO | 2014109566 A1 | 7/2014 |
| WO | 2014113982 A1 | 7/2014 |
| WO | 2015074255 A1 | 5/2015 |

OTHER PUBLICATIONS

Huawei, et al., "Discussion on PRACH Coverage Improvement and Mechanism for Determining the Amount of Needed Coverage Improvement", 3GPP Draft, 3GPP TSG RAN WG1 Meeting #74bis, R1-134054, 3rd Generation Partnership Project (3GPP), Mobile Competence Centre, 650, Route Des Lucioles, F-06921 Sophia-Antipolis Cedex, France, vol. RAN WG1, No. Guangzhou, China, Oct. 7-Oct. 11, 2013, Sep. 28, 2013 (Sep. 28, 2013), XP050717246, 6 Pages, Retrieved from the Internet: URL: http://www.3gpp.org/ftp/tsg_ran/WG1_RL1/TSGR1_74b/Docs/ [retrieved on Sep. 28, 2013] the whole document.

Huawei, et al., "RAR Transmission for MTC UEs", 3GPP TSG RANWG1 Meeting #80bis, R1-151269, 3rd Generation Partnership Project, Mobile Competence Centre, 650, Route Des Lucioles, F-86921 Sophia-Antipolis Cedex, France, vol. RAN WG1, No. Belgrade, Serbia, Apr. 20-Apr. 24, 2015, Apr. 19, 2015, 3 Pages, XP050934149.

Intel Corporation: "Remaining Details of EPDCCH-Based M-PDCCH Design", R1-153186—LNTEL MTC MPDCCHREMDETAILS, 3rd Generation Partnership Project, Mobile Competence Centre, 650, Route Des Lucioles ; F-06921 Sophia-Antipolis Cedex, France, vol. RAN WG1, No. Fukuoka, Japan; May 25-May 29, 20159, May 16, 2015, pp. 1-7, XP050973229.

International Search Report and Written Opinion—PCT/US2016/036149—ISA/EPO—dated Nov. 14, 2016.

LG Electronics: "Discussion on Common Control Messages for MTC UEs", R1-152709,3GPP TSGRAN WG1 Meeting #81 Common Data, 3rd Generation Partnership Project, Mobile Competence Centre, 650, Route Des Lucioles, F-06921 Sophia-Antipolis Cedex, France, vol. RAN WG1, No. Fukuoka, Japan, May 25-May 29, 2015, May 24, 2015, XP050973983, 5 Pages.

NTT DOCOMO: " MPDCCH Set Initialization for Rel-13 Low Complexity MTC", R1-153321 MPDCCH Config, 3rd Generation Partnership Project, Mobile Competence Centre, 650, Route Des Lucioles ; F-06921 Sophia-Antipolis Cedex, France, vol. RAN WG1, No. Fukuoka, Japan; May 25-May 29, 2015, May 24, 2015, XP050973751.

Taiwan Search Report—TW105118006—TIPO—dated Jan. 18, 2020.

Taiwan Search Report—TW105118006—TIPO—dated Sep. 4, 2020.
Taiwan Search Report—TW109114097—TIPO—dated May 2, 2021.
Taiwan Search Report—TW109114097—TIPO—dated Dec. 23, 2021.

Huawei, et al., "RAR Transmission for MTC UEs", 3GPP TSG RANWG1 Meeting #80bis, 3GPP Draft, R1-151269, 3rd Generation Partnership Project (3GPP), Mobile Competence Centre, 658, Route Des Lucioles, F-86921 Sophia-Antipolis Cedex, France, vol. RAN WG1, No. Belgrade, Serbia, Apr. 20-Apr. 24, 2015, Apr. 19, 2015 (Apr. 19, 2015), 3 Pages, XP050934149, Retrieved from the Internet: URL: http://www.3gpp.org/ftp/Meetings_3GPP_SYNC/RAN1/Docs/ [retrieved on Apr. 19, 2015] the whole document.

Intel Corporation: "Remaining Details of EPDCCH-Based M-PDCCH Design", 3GPP Draft; R1-153186—LNTEL MTC MPDC-CHREMDETAILS, 3rd Generation Partnership Project (3GPP), Mobile Competence Centre, 650, Route Des Lucioles ; F-06921 Sophia-Antipolis Cedex, France, vol. RAN WG1, No. Fukuoka, Japan; May 25-May 29, 2015, May 16, 2015 (May 16, 2015), pp. 1-7, XP050973229, Retrieved from the Internet: URL: http://www.3gpp.org/ftp/tsg_ran/WG1_RL1/TSGR1_81/Docs/ [retrieved on May 16, 2015], Sections 1-3.

LG Electronics: "Discussion on Common Control Messages for MTC UEs", 3GPP Draft, R1-152709, 3GPPTSG RAN WG1 Meeting #81 Common Data, 3rd Generation Partnership Project (3GPP), Mobile Competence Centre, 650, Route Des Lucioles, F-06921 Sophia-Antipolis Cedex, France, vol. RAN WG1, No. Fukuoka, Japan, May 25-May 29, 2015, May 24, 2015 (May 24, 2015), XP050973983, 5 Pages, Retrieved from the Internet: URL: http://www.3gpp.org/ftp/Meetings_3GPP_SYNC/RAN1/Docs/ [retrieved on May 24, 2015] the whole document.

NTT DOCOMO: " MPDCCH Set Initialization for Rel-13 Low Complexity Mtc", 3GPP Draft; R1-153321 MPDCCH Config, 3rd Generation Partnership Project (3GPP), Mobile Competence Centre, 650, Route Des Lucioles ; F-06921 Sophia-Antipolis Cedex, France, vol. RAN WG1, No. Fukuoka, Japan; May 25-May 29, 2015, May 24, 2015 (May 24, 2015), XP050973751, Retrieved from

(56) References Cited

OTHER PUBLICATIONS the Internet: URL: http://www.3gpp.org/ftp/Meetings_3GPP_SYNC/RAN 1/Docs/ [retrieved on May 24, 2015], Sections 1-2.
Partial International Search Report—PCT/US2016/036149—ISA/EPO—dated Aug. 24, 2016.
Taiwan Search Report—TW112111414—TIPO—dated Jun. 14, 2023.

* cited by examiner

COMMON SEARCH SPACE FOR MACHINE TYPE COMMUNICATIONS

CLAIM OF PRIORITY

The present Application for Patent is a continuation of U.S. patent application Ser. No. 16/195,338, filed Nov. 19, 2018, now U.S. Pat. No. 10,820,177 with an issue date of Oct. 27, 2020, which is a continuation of U.S. patent application Ser. No. 15/174,678, filed Jun. 6, 2016, now U.S. Pat. No. 10,165,423 with an issue date of Dec. 25, 2018, which claims priority to U.S. Provisional Application No. 62/191,253, filed Jul. 10, 2015, and U.S. Provisional Application No. 62/288,425, filed Jan. 28, 2016, all of which are assigned to the assignee of the present application and hereby expressly incorporated by reference herein in their entireties.

FIELD OF THE INVENTION

Certain aspects of the present disclosure generally relate to wireless communications and more specifically to search space configuration in systems utilizing devices with limited communications resources, such as machine type communication(s) (MTC) devices and enhanced or evolved MTC (eMTC) devices.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some UEs may be considered machine type communication (MTC) UEs, which may include remote devices, that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a base station (BS). The method generally includes receiving a physical random access channel (PRACH) signal from a first user equipment (UE) on a first narrowband region within a wider system bandwidth and transmitting, in response to the PRACH signal, a random access response (RAR) signal in a first search space in a second narrowband region in at least a first subframe.

Certain aspects of the present disclosure provide a method for wireless communications by a user equipment (UE). The method generally includes transmitting a physical random access channel (PRACH) signal to a base station (BS) on a first narrowband region within a wider system bandwidth and receiving, in response to the PRACH signal, a random access response (RAR) signal in a first search space in a second narrowband region in at least a first subframe.

Certain aspects of the present disclosure provide a method for wireless communications by a base station (BS). The method generally includes determining a coverage enhancement (CE) level of a UE, initializing a scrambling sequence for transmitting a signal to the UE based on the CE level, scrambling the signal to the UE with the scrambling sequence, and transmitting the scrambled signal to the UE.

Certain aspects of the present disclosure provide a method for wireless communications by a user equipment (UE). The method generally includes initializing a scrambling sequence based on a coverage enhancement (CE) level of the UE, receiving a signal scrambled with the scrambling sequence, and descrambling the signal with the scrambling sequence.

Certain aspects of the present disclosure provide a method for wireless communications performed by a base station (BS). The method generally includes scrambling a first demodulation reference signal (DM-RS) to a first UE with a first scrambling sequence initialized with a scrambling sequence initialization, scrambling a second DM-RS to a second UE with a second scrambling sequence initialized with the scrambling sequence initialization, and transmitting the scrambled first DM-RS to the first UE and the scrambled second DM-RS to the second UE in a same search space.

Certain aspects of the present disclosure provide a method for wireless communications performed by a user equipment (UE). The method generally includes receiving a first demodulation reference signal (DM-RS) scrambled with a first scrambling sequence initialized with a scrambling sequence initialization, receiving a signal scrambled with the first scrambling sequence in a search space, wherein at least a second DM-RS scrambled with a second scrambling sequence initialized with the scrambling sequence initialization is transmitted in the search space, and descrambling the signal with the first scrambling sequence.

Certain aspects of the present disclosure provide a method for wireless communications performed by a base station (BS). The method generally includes determining a set of repetitions for transmitting a downlink channel, determining a power boost value for the downlink channel, transmitting an indication of the power boost value for the downlink channel, and transmitting the downlink channel based on the set of repetitions and the power boost value.

Certain aspects of the present disclosure provide a method for wireless communications performed by a user equipment (UE). The method generally includes determining a first set of repetitions for receiving a downlink channel, determining a received signal quality, determining a second set of repetitions for receiving the downlink channel based at least in part on the first set of repetitions and the received signal quality, and receiving the downlink channel based on the second set of repetitions.

Certain aspects of the present disclosure provide an apparatus for wireless communications. The apparatus generally includes at least one processor configured to receive a physical random access channel (PRACH) signal from a first user equipment (UE) on a first narrowband region within a wider system bandwidth and transmit, in response to the PRACH signal, a random access response (RAR) message in a first search space in a second narrowband region in at least a first subframe.

Certain aspects of the present disclosure provide an apparatus for wireless communications. The apparatus generally includes at least one processor configured to scramble a first demodulation reference signal (DM-RS) to a first UE with a first scrambling sequence initialized with a scrambling sequence initialization, scramble a second DM-RS to a second UE with a second scrambling sequence initialized with the scrambling sequence initialization, and transmit the scrambled first DM-RS to the first UE and the scrambled second DM-RS to the second UE in a same search space.

Certain aspects of the present disclosure provide an apparatus for wireless communications. The apparatus generally includes at least one processor configured to transmit a physical random access channel (PRACH) signal to a base station (BS) on a first narrowband region within a wider system bandwidth and receive, in response to the PRACH signal, a random access response (RAR) message in a first search space in a second narrowband region in at least a first subframe.

Certain aspects of the present disclosure provide an apparatus for wireless communications. The apparatus generally includes at least one processor configured to receive a first demodulation reference signal (DM-RS) scrambled with a first scrambling sequence initialized with a scrambling sequence initialization, receive a signal scrambled with the first scrambling sequence in a search space, wherein at least a second DM-RS scrambled with a second scrambling sequence initialized with the scrambling sequence initialization is transmitted in the search space, and descramble the signal with the first scrambling sequence.

Certain aspects of the present disclosure provide an apparatus for wireless communications. The apparatus generally includes means for receiving a physical random access channel (PRACH) signal from a first user equipment (UE) on a first narrowband region within a wider system bandwidth and means for transmitting, in response to the PRACH signal, a random access response (RAR) message in a first search space in a second narrowband region in at least a first subframe.

Certain aspects of the present disclosure provide an apparatus for wireless communications. The apparatus generally includes means for scrambling a first demodulation reference signal (DM-RS) to a first UE with a first scrambling sequence initialized with a scrambling sequence initialization, means for scrambling a second DM-RS to a second UE with a second scrambling sequence initialized with the scrambling sequence initialization, and means for transmitting the scrambled first DM-RS to the first UE and the scrambled second DM-RS to the second UE in a same search space.

Certain aspects of the present disclosure provide an apparatus for wireless communications. The apparatus generally includes means for transmitting a physical random access channel (PRACH) signal to a base station (BS) on a first narrowband region within a wider system bandwidth and means for receiving, in response to the PRACH signal, a random access response (RAR) message in a first search space in a second narrowband region in at least a first subframe.

Certain aspects of the present disclosure provide an apparatus for wireless communications. The apparatus generally includes means for receiving a first demodulation reference signal (DM-RS) scrambled with a first scrambling sequence initialized with a scrambling sequence initialization, means for receiving a signal scrambled with the first scrambling sequence in a search space, wherein at least a second DM-RS scrambled with a second scrambling sequence initialized with the scrambling sequence initialization is transmitted in the search space, and means for descrambling the signal with the first scrambling sequence.

Certain aspects of the present disclosure provide a computer readable medium for wireless communications. The computer readable medium generally includes code for receiving a physical random access channel (PRACH) signal from a first user equipment (UE) on a first narrowband region within a wider system bandwidth and code for transmitting, in response to the PRACH signal, a random access response (RAR) message in a first search space in a second narrowband region in at least a first subframe.

Certain aspects of the present disclosure provide a computer readable medium for wireless communications. The computer readable medium generally includes code for scrambling a first demodulation reference signal (DM-RS) to a first UE with a first scrambling sequence initialized with a scrambling sequence initialization, code for scrambling a second DM-RS to a second UE with a second scrambling sequence initialized with the scrambling sequence initialization, and code for transmitting the scrambled first DM-RS to the first UE and the scrambled second DM-RS to the second UE in a same search space.

Certain aspects of the present disclosure provide a computer readable medium for wireless communications. The computer readable medium generally includes code for transmitting a physical random access channel (PRACH) signal to a base station (BS) on a first narrowband region within a wider system bandwidth and code for receiving, in response to the PRACH signal, a random access response (RAR) message in a first search space in a second narrowband region in at least a first subframe.

Certain aspects of the present disclosure provide a computer readable medium for wireless communications. The computer readable medium generally includes code for receiving a first demodulation reference signal (DM-RS) scrambled with a first scrambling sequence initialized with a scrambling sequence initialization, code for receiving a signal scrambled with the first scrambling sequence in a search space, wherein at least a second DM-RS scrambled with a second scrambling sequence initialized with the scrambling sequence initialization is transmitted in the search space, and code for descrambling the signal with the first scrambling sequence.

Numerous other aspects are provided including methods, apparatus, systems, computer program products, computer readable medium, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
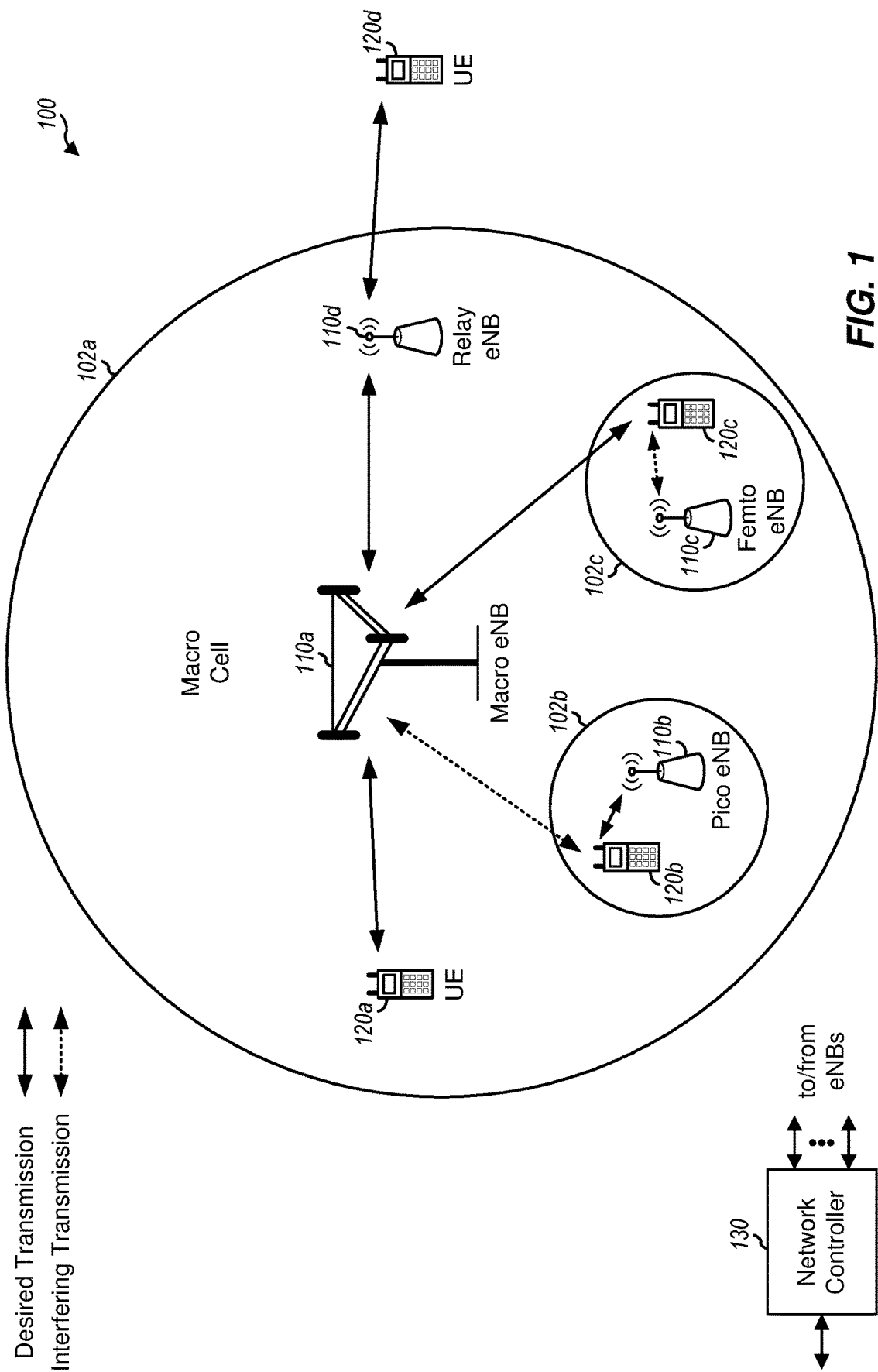
FIG. 1 is a block diagram conceptually illustrating an example wireless communication network, in accordance with certain aspects of the present disclosure.

Aspects of the present disclosure provide techniques and apparatus for enhanced paging messages and random access response (RAR) messages for devices with limited communication resources, such as low cost (LC) machine type communication (MTC) devices, LC enhanced MTC (eMTC) devices, etc. MTC and eMTC devices may receive MTC physical downlink control channel (MPDCCH) transmissions carrying paging messages and RAR messages. MTC and eMTC devices may attempt to decode MPDCCH candidates in search spaces of time and frequency transmission resources. MPDCCHs may be transmitted in common search spaces (CSS). Base stations may transmit MPDCCHs conveying paging and RAR messages in CSS selected based at least in part on a coverage enhancement (CE) level of a receiving UE and/or a subband used by a UE when transmitting a physical random access channel (PRACH). To enhance coverage of certain devices, such as MTC and eMTC devices, "bundling" may be utilized in which certain transmissions are sent as a bundle of transmissions, for example, with the same information transmitted over multiple subframes.

Accordingly, as will be described in more detail below, the techniques presented herein may allow for cells to transmit and MTC devices to receive paging and RAR messages that are bundled to achieve CE of up to 15 dB. In addition, techniques presented herein may allow for cells to transmit and MTC devices to receive paging and RAR messages in situations when a cell needs to transmit both paging and RAR messages in one subframe, sometimes referred to as a collision between paging and RAR messages.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below. LTE and LTE-A are referred to generally as LTE.

FIG. 1 illustrates an example wireless communication network 100 with base stations (BSs) and user equipments (UEs), in which aspects of the present disclosure may be practiced.

For example, one or more paging procedure enhancements for certain UEs (e.g., LC MTC UEs, LC eMTC UEs, etc.) in the wireless communication network 100 may be supported. According to the techniques presented herein, the BSs and LC UE(s) in the wireless communication network 100 may be able to determine, from the available system bandwidth supported by the wireless communication network 100, which narrowband region(s) the LC UE(s) should monitor for a bundled paging message transmitted from the BSs in the wireless communication network 100. Also, according to techniques presented herein, the BSs and/or LC UE(s) in the wireless communication network 100 may be able to determine and/or adapt the bundling size for the paging message based on one or more triggers in the wireless communication network 100.

The wireless communication network 100 may be an LTE network or some other wireless network. Wireless communication network 100 may include a number of evolved NodeBs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay (station) eNB 110d may communicate with macro eNB 110a and a UE 120d in order to facilitate communication between eNB 110a and UE 120d. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, navigation devices, gaming devices, cameras, a vehicular device, a drone, a robot/robotic device, a wearable device (e.g., smart watch, smart clothing, smart wristband, smart ring, smart bracelet, smart glasses, virtual reality goggles), a medical device, a healthcare device, etc. MTC UEs include devices such as sensors, meters, monitors, location tags, drones, trackers, robots/robotic devices, etc. UEs (e.g., MTC devices) may be implemented as internet of everything (IoE) or internet of things (IoT) (e.g., narrowband IoT (NB-IoT)) devices.

One or more UEs 120 in the wireless communication network 100 (e.g., an LTE network) may also be low cost (LC), low data rate devices, e.g., such as LC MTC UEs, LC eMTC UEs, etc. The LC UEs may co-exist with legacy and/or advanced UEs in the LTE network and may have one or more capabilities that are limited when compared to the other UEs (e.g., non-LC UEs) in the wireless network. For example, when compared to legacy and/or advanced UEs in the LTE network, the LC UEs may operate with one or more of the following: a reduction in maximum bandwidth (relative to legacy UEs), a single receive radio frequency (RF) chain, reduction of peak rate, reduction of transmit power, rank 1 transmission, half duplex operation, etc. As used herein, devices with limited communication resources, such as MTC devices, eMTC devices, etc. are referred to generally as LC UEs. Similarly, legacy devices, such as legacy and/or advanced UEs (e.g., in LTE) are referred to generally as non-LC UEs.

Figure 2:
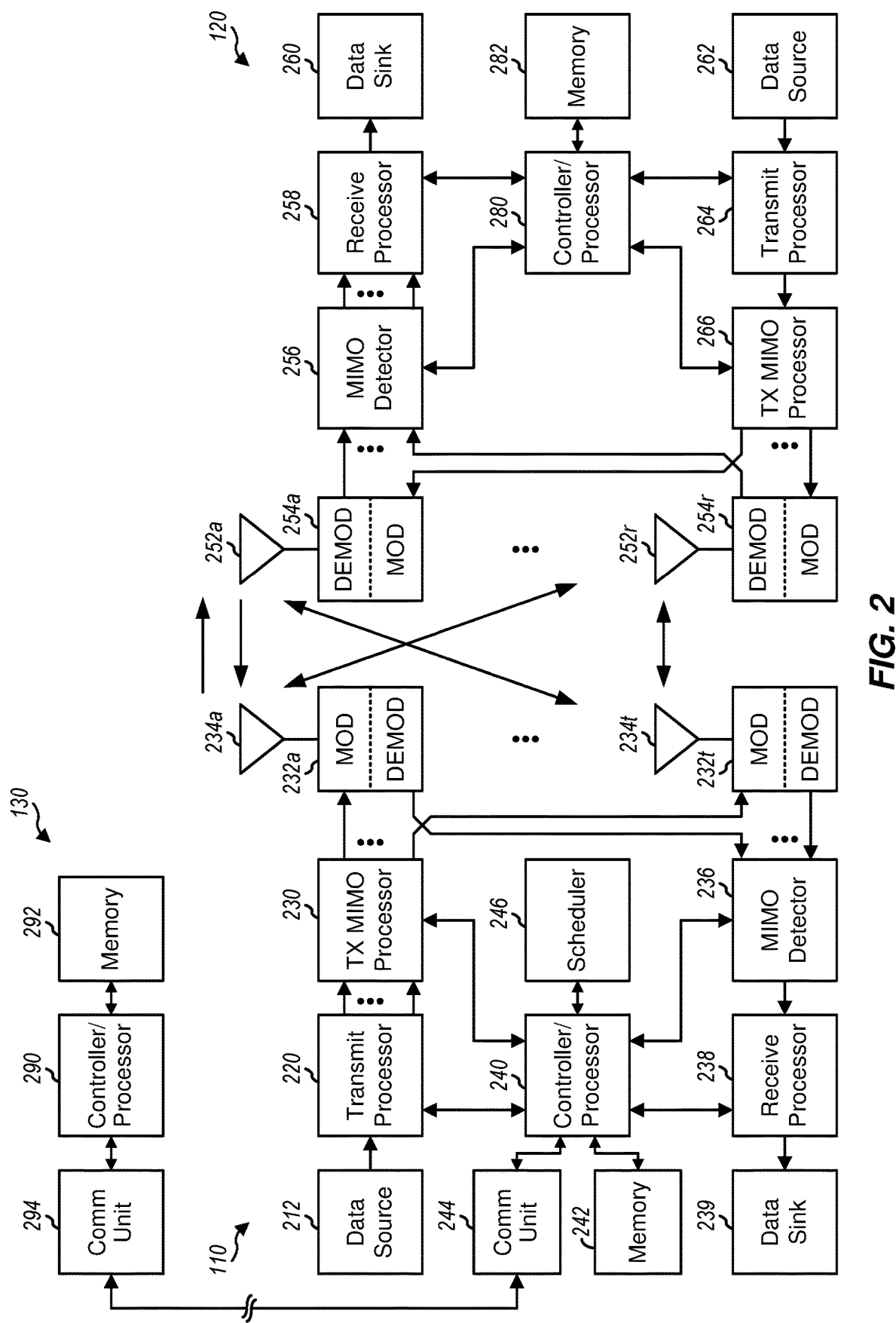
FIG. 2 is a block diagram conceptually illustrating an example of an evolved nodeB (eNB) in communication with a user equipment (UE) in a wireless communications network, in accordance with certain aspects of the present disclosure.

FIG. 2 is a block diagram of a design of BS/eNB 110 and UE 120, which may be one of the BSs/eNBs 110 and one of the UEs 120, respectively, in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other BSs and may provide received signals to demodulators (DEMODs) 254a through 254r, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to BS 110. At BS 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively. For example, controller/processor 240 and/or other processors and modules at BS 110 may perform or direct operations illustrated in FIGS. 7, 11, 13 and/or other processes for the techniques described herein. Similarly, controller/processor 280 and/or other processors and modules at UE 120 may perform or direct operations illustrated in FIGS. 8, 12, 14 and/or processes for the techniques described herein. Memories 242 and 282 may store data and program codes for BS 110 and UE 120, respectively. A scheduler 246 may schedule UEs for data transmission on the downlink and/or uplink.

Figure 3:
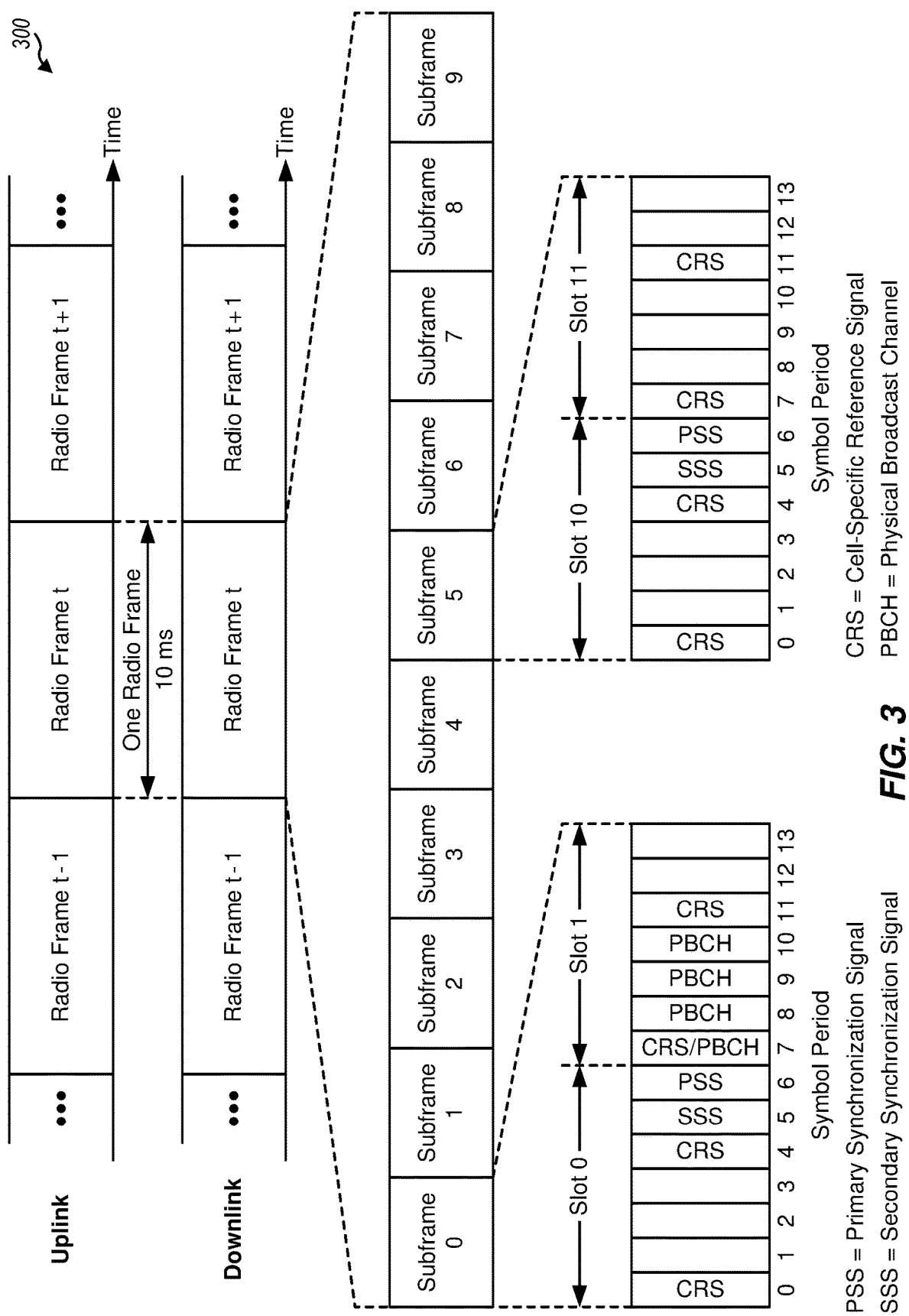
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
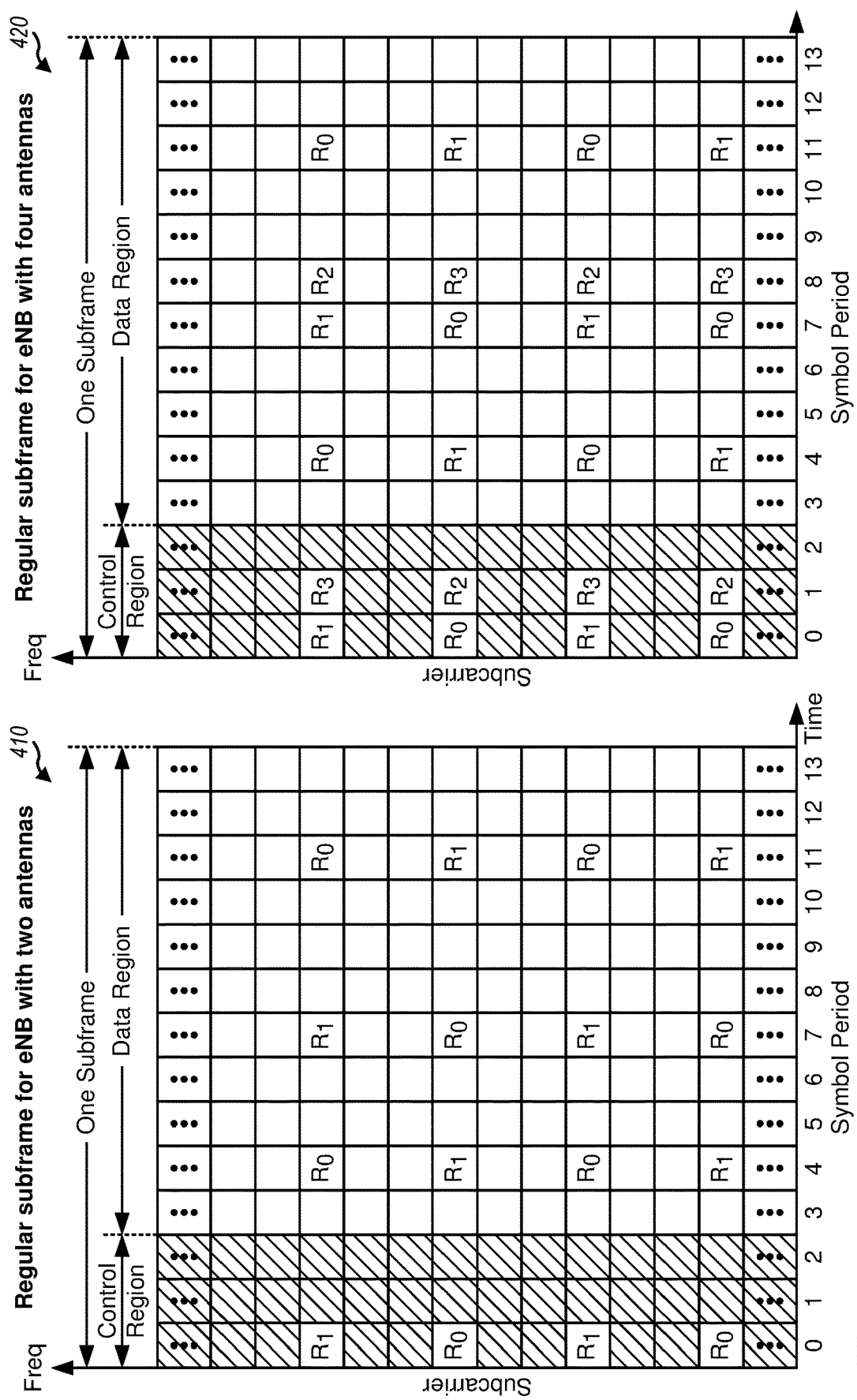
FIG. 4 illustrates example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

As mentioned above, one or more UEs in the wireless communication network (e.g., wireless communication network 100) may be devices that have limited communication resources, such as LC UEs, as compared to other (non-LC) devices in the wireless communication network.

In some systems, for example, in LTE Rel-13 and other releases, the LC UE may be limited to a particular narrowband assignment (e.g., of no more than one resource block (RB) or no more than six RBs) within the available system bandwidth. However, the LC UE may be able to re-tune (e.g., operate and/or camp) to different narrowband regions within the available system bandwidth of the LTE system, for example, in order to co-exist within the LTE system.

As another example of coexistence within the LTE system, LC UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the LC UE may be able to receive the legacy PBCH with one or more additional repetitions of the PBCH across multiple subframes. As another example, the LC UE may be able to transmit one or more repetitions of PRACH (e.g., with one or more PRACH formats supported) to an eNB in the LTE system. The PRACH may be used to identify the LC UE. Also, the number of repeated PRACH attempts may be configured by the eNB.

The LC UE may also be a link budget limited device and may operate in different modes of operation (e.g. entailing different amounts of repeated messages transmitted to or from the LC UE) based on its link budget limitation. For example, in some cases, the LC UE may operate in a normal coverage mode in which there is little to no repetition (e.g., the amount of repetition needed for the UE to successfully receive and/or transmit a message may be low or repetition may not even be needed). Alternatively, in some cases, the LC UE may operate in a coverage enhancement (CE) mode in which there may be high amounts of repetition. For example, for a 328 bit payload, a LC UE in CE mode may need 150 or more repetitions of the payload in order to successfully receive the payload.

In some cases, e.g., also for LTE Rel-13, the LC UE may have limited capabilities with respect to its reception of broadcast and unicast transmissions. For example, the maximum transport block (TB) size for a broadcast transmission received by the LC UE may be limited to 1000 bits. Additionally, in some cases, the LC UE may not be able to receive more than one unicast TB in a subframe. In some cases (e.g., for both the CE mode and normal mode described above), the LC UE may not be able to receive more than one broadcast TB in a subframe. Further, in some cases, the LC UE may not be able to receive both a unicast TB and a broadcast TB in a subframe.

For MTC, LC UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-LC UEs. For example, as compared to conventional paging messages used in LTE, LC UEs may be able to monitor and/or receive paging messages that non-LC UEs may not be able to monitor and/or receive. Similarly, as compared to conventional random access response (RAR) messages used in a conventional random access procedure, LC UEs may be able to receive RAR messages that also may not be able to be received by non-LC UEs. The new paging and RAR messages associated with LC UEs may also be repeated one or more times (e.g., "bundled"). In addition, different numbers of repetitions (e.g., different bundling sizes) for the new messages may be supported.

Figure 5A:
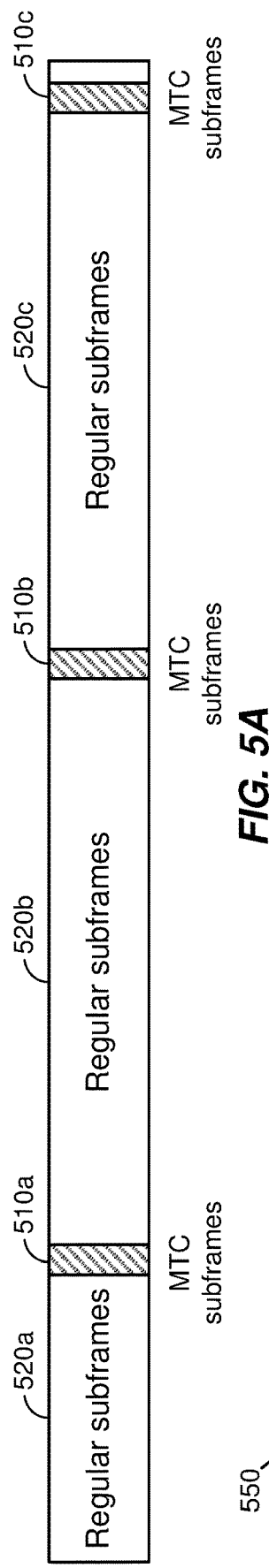
FIGS. 5A and 5B illustrate an example of MTC coexistence within a wideband system, such as LTE, in accordance with certain aspects of the present disclosure.
Figure 5B:
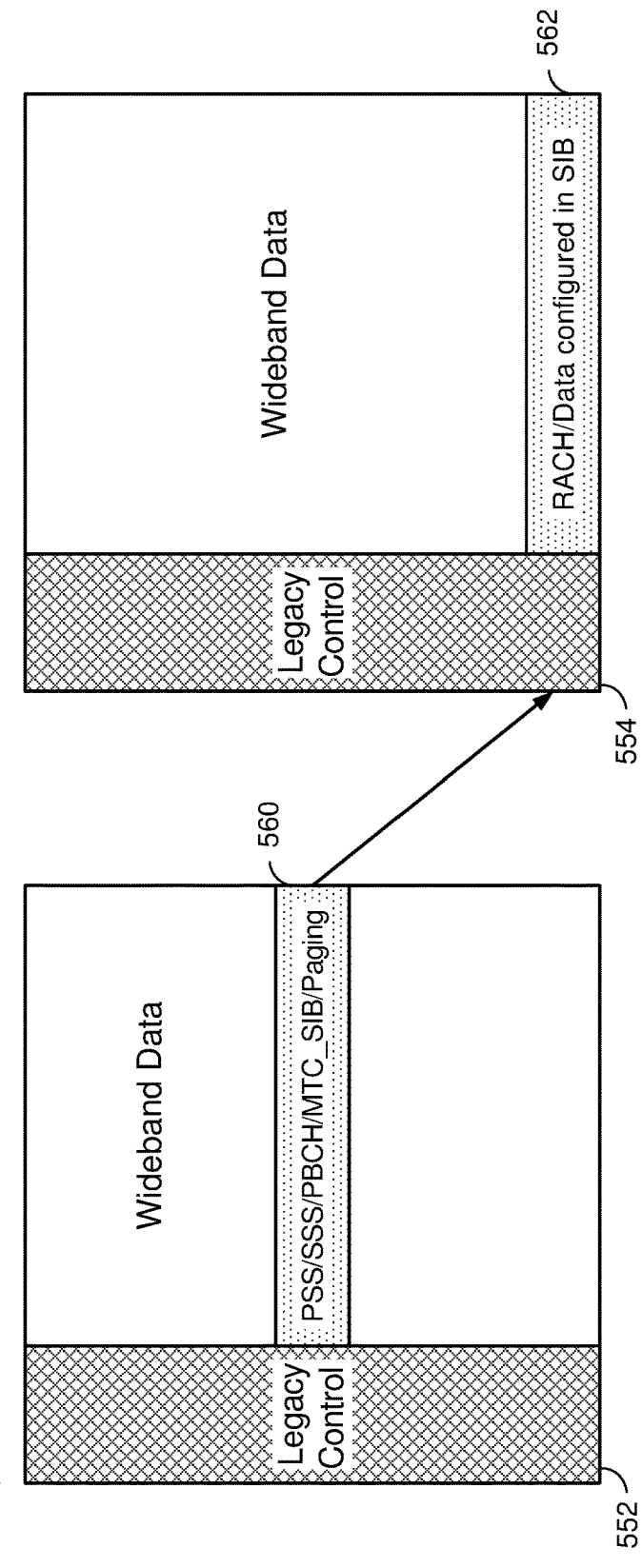

As mentioned above, MTC and/or eMTC operation may be supported in the wireless communication network (e.g., in coexistence with LTE or some other RAT). FIGS. 5A and 5B, for example, illustrate an example of how LC UEs in MTC operation may co-exist within a wideband system, such as LTE.

As illustrated in the example frame structure of FIG. 5A, subframes 510 associated with MTC and/or eMTC operation may be time division multiplexed (TDM) with regular subframes 520 associated with LTE (or some other RAT).

Additionally or alternatively, as illustrated in the example frame structure of FIG. 5B, one or more narrowband regions 560, 562 used by LC UEs in MTC may be frequency division multiplexed within the wider bandwidth 550 supported by LTE. Multiple narrowband regions, with each narrowband region spanning a bandwidth that is no greater than a total of 6 RBs, may be supported for MTC and/or eMTC operation. In some cases, each LC UE in MTC operation may operate within one narrowband region (e.g., at 1.4 MHz or 6 RBs) at a time. However, LC UEs in MTC operation, at any given time, may re-tune to other narrowband regions in the wider system bandwidth. In some examples, multiple LC UEs may be served by the same narrowband region. In other examples, multiple LC UEs may be served by different narrowband regions (e.g., with each narrowband region spanning 6 RBs). In yet other examples, different combinations of LC UEs may be served by one or more same narrowband regions and/or one or more different narrowband regions.

The LC UEs may operate (e.g., monitor/receive/transmit) within the narrowband regions for various different operations. For example, as shown in FIG. 5B, a first narrowband region 560 (e.g., spanning no more than 6 RBs of the wideband data) of a subframe 552 may be monitored by one or more LC UEs for either a PSS, SSS, PBCH, MTC signaling, or paging transmission from a BS in the wireless communication network. As also shown in FIG. 5B, a second narrowband region 562 (e.g., also spanning no more than 6 RBs of the wideband data) of a subframe 554 may be used by LC UEs to transmit a RACH or data previously configured in signaling received from a BS. In some cases, the second narrowband region may be utilized by the same LC UEs that utilized the first narrowband region (e.g., the LC UEs may have re-tuned to the second narrowband region to transmit after monitoring in the first narrowband region). In some cases (although not shown), the second narrowband region may be utilized by different LC UEs than the LC UEs that utilized the first narrowband region.

Although the examples described herein assume a narrowband of 6 RBs, those skilled in the art will recognize that the techniques presented herein may also be applied to different sizes of narrowband regions (for example, 1 RB, supported by NB-IoT).

As mentioned above, in certain systems, e.g., such as LTE Rel-12, narrowband operation for MTC (e.g., eMTC) may be supported. A cell supporting narrowband operation for MTC may have different system bandwidths for downlink (DL) and uplink (UL) operations. A cell having different DL and UL system bandwidths (SBs) may organize the DL system bandwidth into narrowband regions in a manner different than the manner used to organize the UL system bandwidth into narrowband regions. Accordingly, aspects of the present disclosure provide techniques for organizing a DL system bandwidth and an UL system bandwidth into narrowband regions.

A cell supporting narrowband operation for MTC and legacy UEs may receive legacy PUCCH transmissions from the legacy UEs. Legacy PUCCH transmissions may be transmitted at either or both edges of a UL system bandwidth of a cell. Accordingly, aspects of the present disclosure provide techniques to reserve transmission resources included in an UL narrowband region for use by legacy PUCCH transmissions. Similar reservations may also be applied to a DL narrowband region for use by other legacy DL signals or channels.

A cell supporting narrowband operations for MTC may also support transmission of sounding reference signals (SRS). The current minimum defined bandwidth for transmission of SRS is four RBs. However, as mentioned above, the bandwidth of narrowband regions is six RBs. The fact that six RBs are not divisible by four RBs presents challenges in managing SRS transmissions using four RBs in six-RB based narrowband operations. Accordingly, aspects of the present disclosure provide techniques for assigning transmission resources for transmission of SRS in a cell supporting narrowband operations (e.g., for MTC).

A cell operating with FDD may have a DL system bandwidth that is of a different size than the UL system bandwidth of the cell. For example, a cell may perform DL operations in a system bandwidth of ten MHz and UL operations in a five MHz system bandwidth. To support MTC operations and MTC UEs, the cell may organize the DL system bandwidth and the UL system bandwidth into narrowband regions, or narrowband regions. An eNB or other BS controlling the cell may assign a DL narrowband region to a MTC UE for the MTC UE to monitor for signals from the eNB. Similarly, the eNB (or other BS) may assign a UL narrowband region to the MTC UE for the MTC to use when transmitting UL signals. In the example, the cell may organize the DL system bandwidth into eight DL narrowband regions while organizing the UL system bandwidth into four UL narrowband regions.

When a BS (e.g., an eNB or a cell) supports MTC UEs with the DL system bandwidth and UL system bandwidth of the cell organized into narrowband regions, the BS may establish a mapping between DL narrowband regions and UL narrowband regions, so that assigning a DL narrowband region to an MTC UE implies an assignment of a UL narrowband region to that MTC UE. Having a mapping allows the BS to simplify scheduling of resources in the cell, e.g., the BS can expect ACK/NAKs for transmissions on a DL narrowband region to an MTC UE on the corresponding UL narrowband region. Likewise, an MTC UE monitors for DL transmissions on the assigned DL narrowband region for the MTC UE and responds with transmissions on the corresponding UL narrowband region.

According to aspects of the present disclosure, a technique for mapping UL and DL narrowband regions by a BS is provided. A BS may determine a minimum size of the UL system bandwidth and the DL system bandwidth supported by the BS, determine a number of narrowband regions that can be organized in the determined size, and then organize both the DL system bandwidth and the UL system bandwidth in that number of narrowband regions. The BS may then map each DL narrowband region to one UL narrowband region. For example, a cell may perform DL operations in a system bandwidth of ten MHz and UL operations in a five MHz system bandwidth. In the example, the BS may determine that the minimum size of the UL system bandwidth and the DL system bandwidth is five MHz, and then determine that the BS can organize four narrowband regions in a five MHz system bandwidth. Still in the example, the BS may then organize four DL narrowband regions in the DL system bandwidth and four UL narrowband regions in the UL system bandwidth, and map each DL narrowband region to one UL narrowband region.

Figure 6:
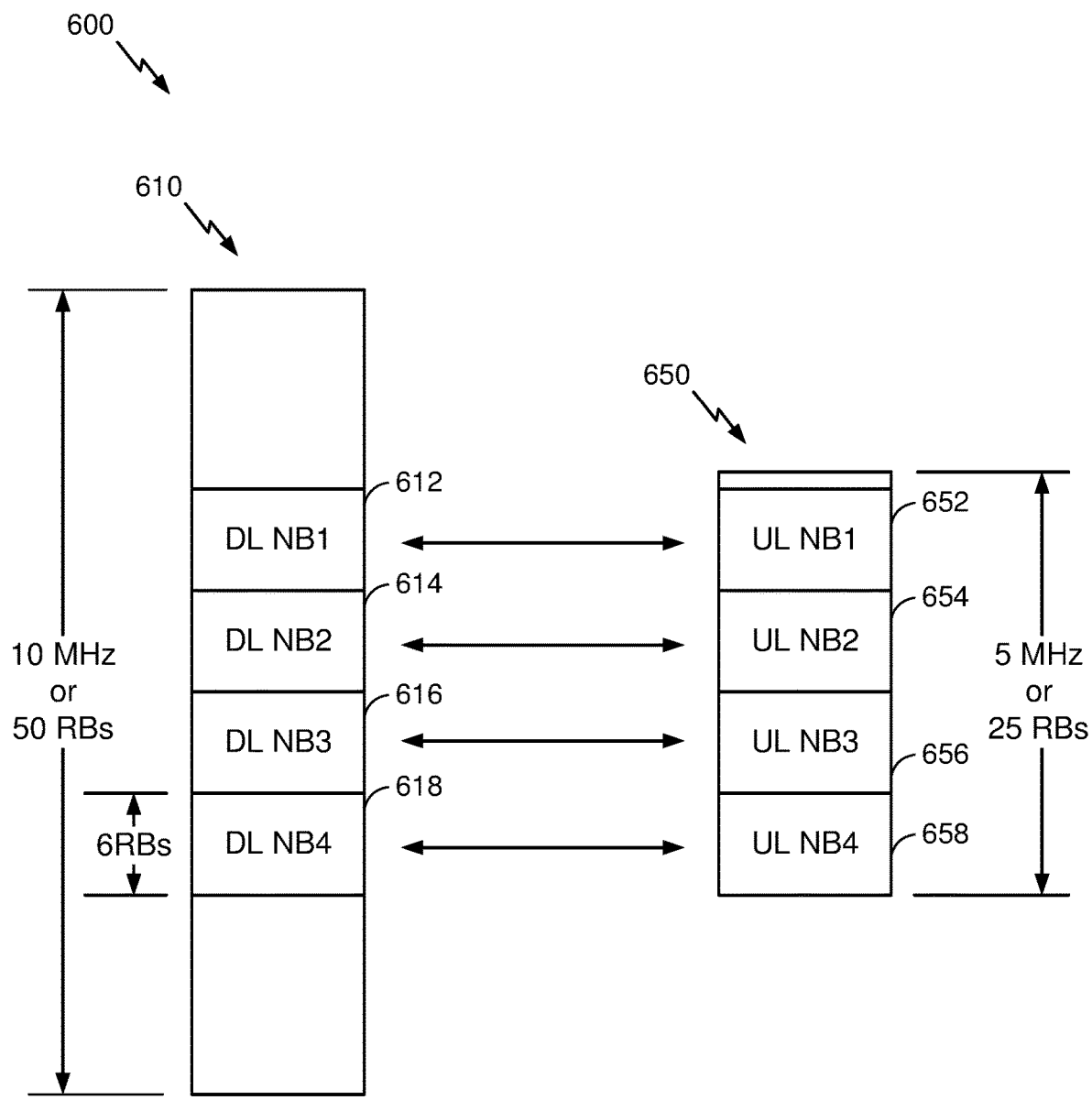
FIG. 6 illustrates an exemplary mapping of DL narrowband regions to UL narrowband regions, in accordance with certain aspects of the present disclosure.

FIG. 6 illustrates an exemplary mapping 600 of DL narrowband regions to UL narrowband regions, as described above. Such a mapping may be employed by eNB 110a in FIG. 1. While FIG. 6 shows the DL system bandwidth 610 and the UL system bandwidth 650 as apparently in the same frequency ranges, the DL system bandwidth and the UL system bandwidth are in different frequency ranges in a cell using FDD. DL system bandwidth 610 is ten MHz or fifty RBs wide, and UL system bandwidth 650 is five MHz or twenty-five RBs wide. A BS supporting MTC UEs while operating DL system bandwidth 610 and UL system bandwidth 650 may determine that the UL system bandwidth 650 is smaller than DL system bandwidth 610 (the 5 MHz size of UL system bandwidth 650 is the minimum size of the UL system bandwidth 650 and the DL system bandwidth 610). The BS may then determine that the BS can organize four narrowband regions 652, 654, 656, and 658 from the UL system bandwidth 650. The BS may then determine to organize four narrowband regions from the DL system bandwidth, and organize DL narrowband regions 612, 614, 616, and 618 from the DL system bandwidth. The BS may then map DL narrowband region 612 to UL narrowband region 652, DL narrowband region 614 to UL narrowband region 654, DL narrowband region 616 to UL narrowband region 656, and DL narrowband region 618 to UL narrowband region 658.

As mentioned above, LC MTC UEs were introduced in LTE Rel-12. Additional enhancements may be made in LTE Release 13 (Rel-13) to support eMTC operations. For example, MTC UEs may be able to operate (e.g., monitor, transmit, and receive) in a narrowband region of 1.4 MHz or six RBs within wider system bandwidths (e.g., 1.4 MHz, 3 MHz, 5 MHz, 10 MHz, 15 MHz, 20 MHz). As a second example, base stations and MTC UEs may support coverage enhancements (CE) of up to 15 dB by some techniques, for example bundling. Coverage enhancement may also be referred to as coverage extension and range extension.

Other enhancements that may be made in LTE Rel-13 may include base stations transmitting paging signals in MTC physical downlink control channels (MPDCCHs) in a narrowband in order to page MTC UEs. An MPDCCH may convey paging signals for multiple MTC UEs and a downlink control information (DCI) to one or more other MTC UEs. MPDCCH may be similar to PDCCH/EPDCCH as described above. Demodulation reference signal (DM-RS) based demodulation may be supported when using MPDCCH. That is, a BS transmitting an MPDCCH may transmit DM-RS with the MPDCCH. A UE receiving the MPDCCH and DM-RS may demodulate the MPDCCH based on the DM-RS.

Enhancements that may be made in LTE Rel-13 may also include BSs transmitting random access response (RAR) signals in an MPDCCH in a narrowband in order to respond to physical random access channel (PRACH) signals from MTC UEs. A BS may send a single RAR message in a DCI in an MPDCCH or multiple RAR messages (e.g., to respond to multiple UEs) in an MPDCCH without a DCI.

A UE that has an active receiver (e.g., the receiver is not powered down) typically monitors for PDCCH (e.g., EPDCCH, MPDCCH) in one or more search spaces. The UE typically monitors at least one common search space and may be configured to monitor a UE-specific search space. A search space includes a set of groups of contiguous control channel elements (CCE). The UE uses an identifier (e.g., a radio network temporary identifier (RNTI)) of the UE in determining if any one of the groups in the search space contains a PDCCH directed at the UE. Monitoring for PDCCHs is further described in 3GPP TS 36.213 "Evolved Universal Terrestrial Radio Access (E-UTRA); Physical layer procedures," which is publicly available and hereby incorporated by reference.

Figure 7:
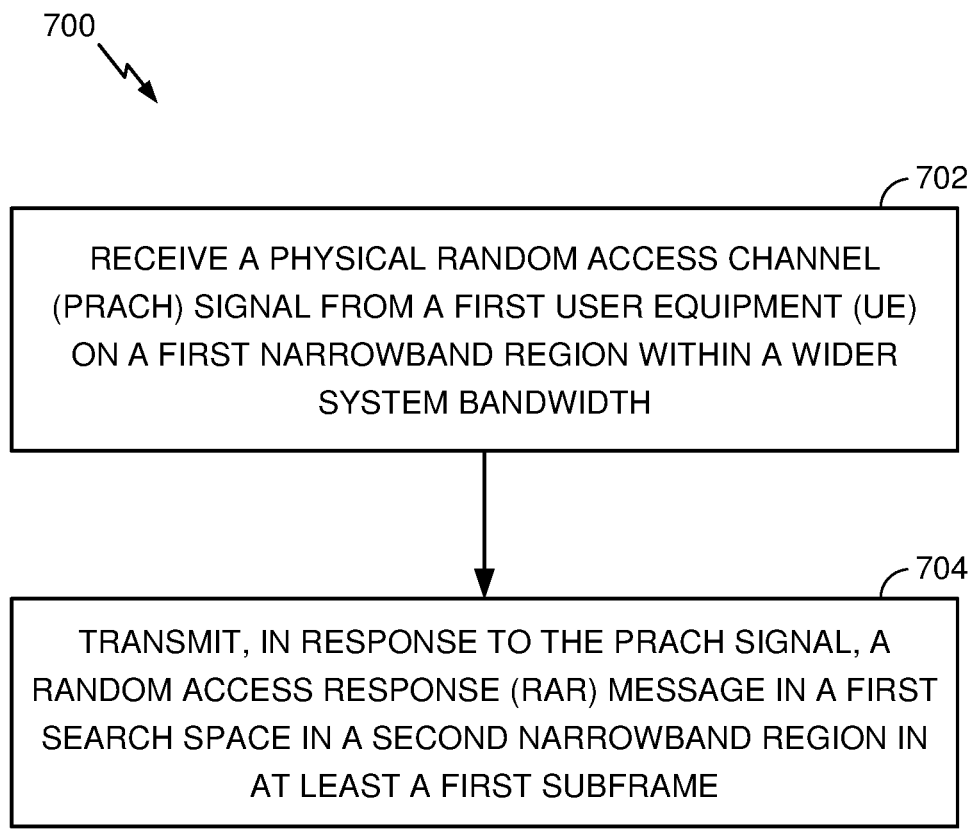
FIG. 7 illustrates an exemplary operation for wireless communications that may be performed by a BS, in accordance with certain aspects of the present disclosure.

FIG. 7 illustrates example operation 700 for wireless communications that may be performed by a BS (e.g., eNodeB 110a in FIG. 1), according to aspects of the present disclosure described above. The operation 700 may be performed by a BS to support MTC UEs, and may use one of the exemplary techniques illustrated in FIGS. 9-10 below.

Operation 700 begins at block 702, wherein the BS receives a physical random access channel (PRACH) signal from a first user equipment (UE) on a first narrowband region within a wider system bandwidth. Operation 700 continues at block 704, wherein the BS transmits, in response to the PRACH signal, a random access response (RAR) message in a first search space in a second narrowband region in at least a first subframe.

According to aspects of the present disclosure, a BS (e.g., the BS mentioned in FIG. 7) may transmit a paging signal in a second search space in a third narrowband region. That is, a BS may transmit paging signals in narrowband regions other than the narrowband regions used for PRACHs and RAR messages.

According to aspects of the present disclosure, a BS (e.g., the BS mentioned in FIG. 7) may identify a third search space in a fourth narrowband region for transmitting RAR messages to a second UE with a different coverage enhancement (CE) level than the first UE. The BS may also transmit information regarding the first search space and a first CE level for the first search space in a system information block (SIB) and transmit information regarding the third search space and a second CE level for the third search space in at least one of the SIB or another SIB. That is, a BS may transmit information regarding search spaces and CE levels in one or more SIBs.

According to aspects of the present disclosure, a BS (e.g., the BS mentioned in FIG. 7) may transmit information regarding the first search space in a SIB. For example, a BS that does not differentiate between CE levels may broadcast information regarding a search space in a SIB.

According to aspects of the present disclosure, a BS (e.g., the BS mentioned in FIG. 7) may determine a RAR response window, a set of machine type communications (MTC) physical downlink control channel (MPDCCH) starting point subframes, a RAR offset number of subframes, and a bundle size for each of a plurality of coverage enhancement (CE) levels. That is, a BS may use different RAR response windows, MPDCCH starting point subframes, RAR offset numbers, and bundle sizes for different CE levels, and the BS may determine those various RAR response windows, MPDCCH starting point subframes, RAR offset numbers, and bundle sizes for the different CE levels.

According to aspects of the present disclosure, a BS (e.g., the BS mentioned in FIG. 7) may determine a radio frequency for paging, a time for paging, a bundle size for paging, and a set of monitoring candidates based at least on a maximum coverage enhancement (CE) level supported by the BS.

According to aspects of the present disclosure, a BS (e.g., the BS mentioned in FIG. 7) may refrain from transmitting a dedicated channel to the first UE during at least a second subframe and transmit at least one system information (SI) change or earthquake and tsunami warning system (ETWS) signal in a broadcast channel of the wider system bandwidth during at least the second subframe.

Figure 8:
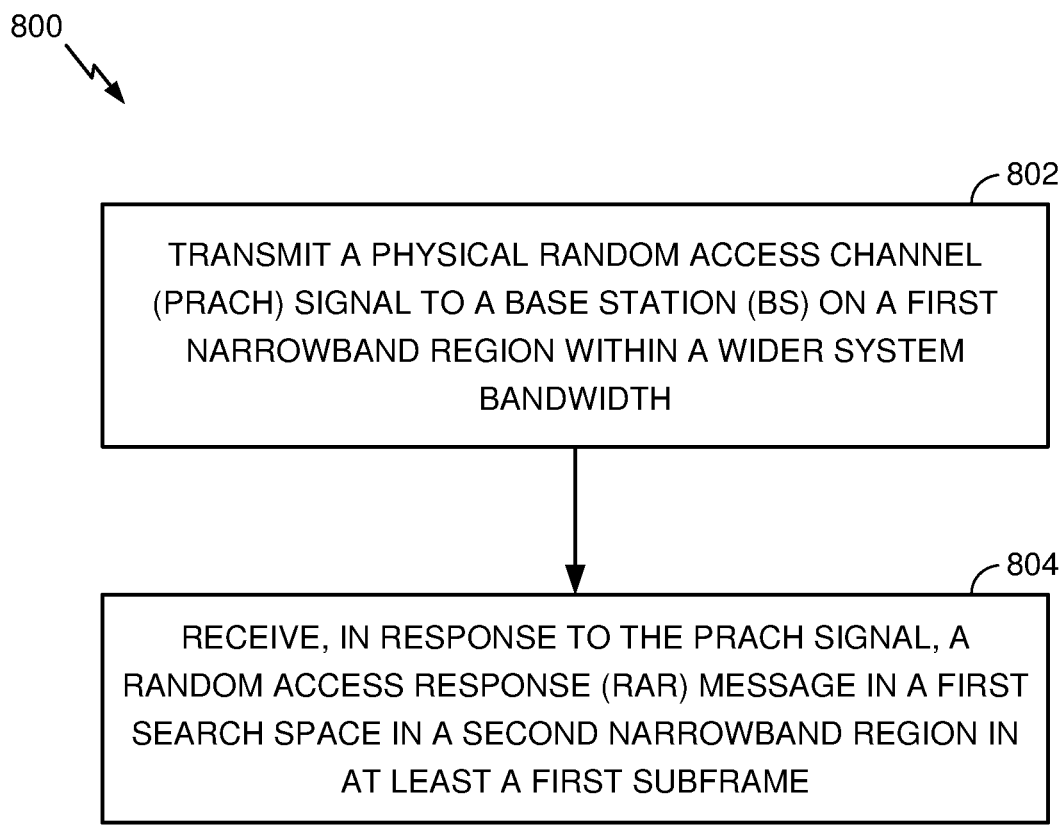
FIG. 8 illustrates an exemplary operation for wireless communications that may be performed by a UE, in accordance with certain aspects of the present disclosure.

FIG. 8 illustrates example operation 800 for wireless communications that may be performed by a UE (e.g., UE 120a in FIG. 1), according to aspects of the present disclosure. The operation 800 may be performed by an MTC UE, for example, and may use one of the exemplary techniques illustrated in FIGS. 9-10 below. The operation 800 may be considered complimentary to the operation 700 in FIG. 7 described above.

Operation 800 begins at block 802, wherein the UE transmits a physical random access channel (PRACH) signal to a base station (BS) on a first narrowband region within a wider system bandwidth. Operation 800 continues at block 804, wherein the UE receives, in response to the PRACH signal, a random access response (RAR) message in a first search space in a second narrowband region in at least a first subframe.

According to aspects of the present disclosure, an MTC UE may be configured with an MPDCCH common search space (e.g., the first search space mentioned in block 804 above) within a narrowband region of a wider system bandwidth. A BS serving MTC UEs may be configured to transmit MPDCCHs conveying paging signals and RAR messages in an MPDCCH common search space (e.g., the first search space mentioned in block 704 above) within a narrowband region of a wider system bandwidth.

According to aspects of the present disclosure, a BS may transmit paging signals and RAR messages (e.g., the RAR message mentioned in block 804 above) in MPDCCHs within an MPDCCH common search space, according to aspects of the present disclosure. A BS transmitting MPDCCHs within an MPDCCH common search space may multiplex paging and RAR messages within the MPDCCHs.

According to aspects of the present disclosure, a UE (e.g., the UE mentioned in FIG. 8) may identify a third search space in a fourth narrowband region for receiving RAR messages based at least in part on a coverage enhancement (CE) level of the UE, receive information regarding the first search space and a first CE level for the first search space in a system information block (SIB), and receive information regarding the third search space and a second CE level for the third search space in at least one of the SIB or another SIB.

According to aspects of the present disclosure, a UE (e.g., the UE mentioned in FIG. 8) may determine a RAR response window, a set of machine type communications (MTC) physical downlink control channel (MPDCCH) starting point subframes, a RAR offset number of subframes, and a bundle size for each of a plurality of coverage enhancement (CE) levels.

According to aspects of the present disclosure, a UE (e.g., the UE mentioned in FIG. 8) may determine a radio frequency for paging, a time for paging, a bundle size for paging, and a set of monitoring candidates based at least on a maximum coverage enhancement (CE) level supported by the BS. The UE may also receive information regarding the maximum CE level supported by the BS (e.g., in a SIB transmitted by the BS).

According to aspects of the present disclosure, a UE (e.g., the UE mentioned in FIG. 8) may receive at least one of a system information (SI) change or earthquake and tsunami warning system (ETWS) signal in the second narrowband region.

According to aspects of the present disclosure, a UE (e.g., the UE mentioned in FIG. 8) may receive at least one SI change or ETWS signal in a broadcast channel of the wider system bandwidth during at least a second subframe.

Figure 9:
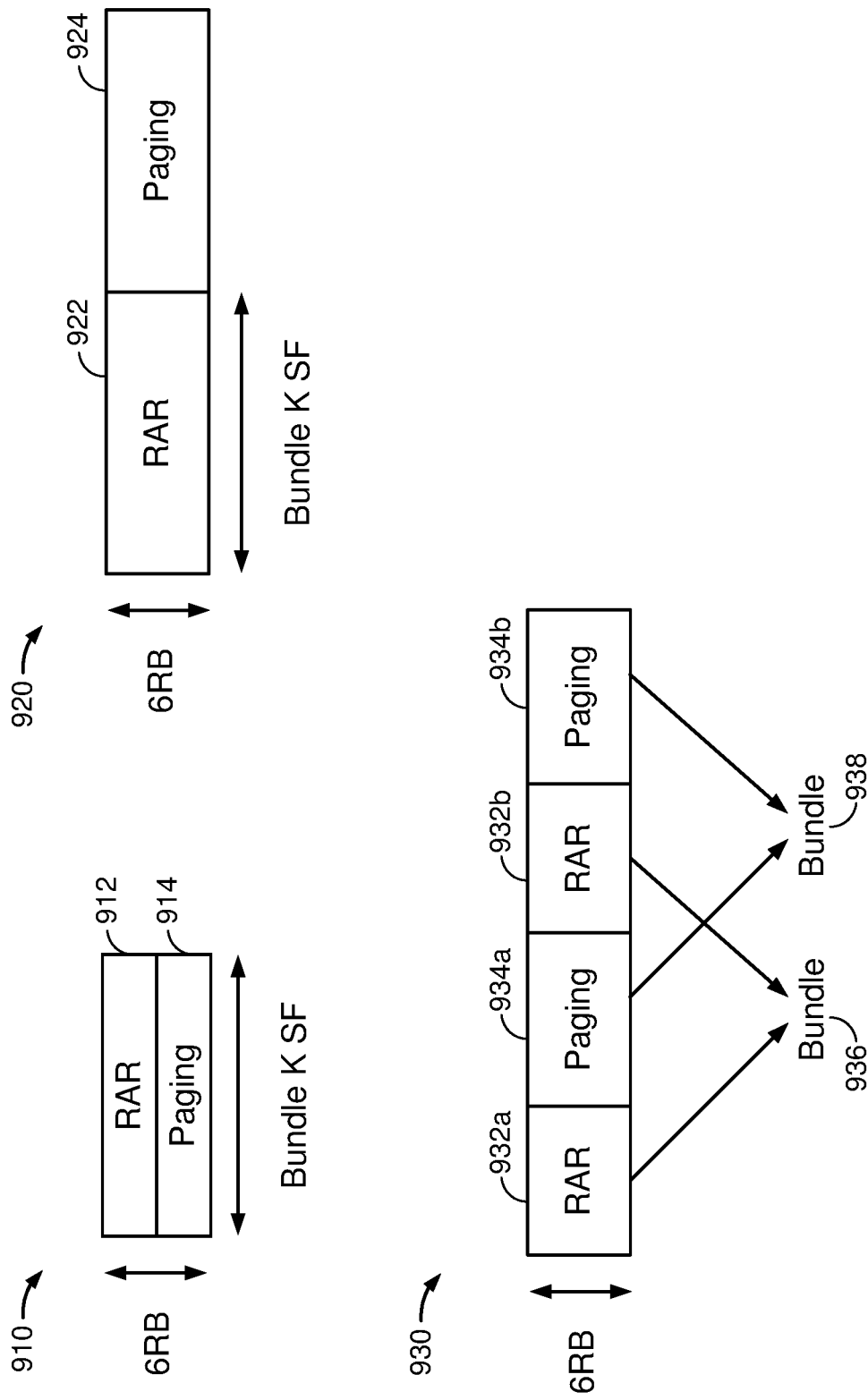
FIG. 9 illustrates exemplary techniques for multiplexing MPDCCHs, in accordance with certain aspects of the present disclosure.

FIG. 9 illustrates exemplary techniques 910, 920, and 930 for multiplexing MPDCCHs conveying paging signals with MPDCCHs conveying RAR messages. In exemplary technique 910, an MPDCCH 912 conveying a RAR message is frequency division multiplexed with an MPDCCH 914 conveying a paging signal. While the exemplary technique shows the MPDCCHs bundled over K subframes (SF), the disclosure is not so limited and the MPDCCHs may be multiplexed in a single subframe. In exemplary technique 920, an MPDCCH 922 conveying a RAR message is time division multiplexed with an MPDCCH 924 conveying a paging signal. The technique shows each MPDCCH bundled over K subframes (SF), but the disclosure is not so limited and each MPDCCH may be transmitted in a single subframe. In exemplary technique 930, an MPDCCH 932 conveying a RAR message is time division multiplexed with an MPDCCH 934 conveying a paging signal, but each MPDCCH is conveyed in a non-continuous bundle 936, 938. That is, each MPDCCH is bundled over a plurality (e.g., 2, 4, 8) of subframes, but each of the bundles includes subframes that are not all consecutive.

When a BS pages a UE operating in a coverage enhancement (CE) level of more than 0 dB (e.g., 3 dB, 15 dB), the BS may transmit a plurality or bundle of MPDCCHs conveying paging signals in a plurality of subframes (e.g., the bundles illustrated in techniques 910, 920, and 930 in FIG. 9 above) to the UE. The subframes may be continuous or non-continuous. That is, the BS may transmit MPDCCHs in consecutive subframes, in groups of consecutive subframes with subframes between the groups, or in non-consecutive subframes. The paged UE may receive the MPDCCHs in the bundle of subframes, combine the paging signals, and decode the combination. Combining the MPDCCHs may increase the probability of the UE successfully decoding the MPDCCH and detecting the paging signal.

A BS configured to support UEs with a CE level above 0 dB may signal, for example in a system information block (SIB) or via radio resource control, information regarding a bundling technique(s) (e.g., techniques 910, 920, and/or 930 in FIG. 9 above) used by the BS when paging UEs. Such information may include, for example, a starting subframe of a paging occasion and a repetition pattern for the paging occasion. A UE supported by the BS may receive the information and determine which subframes contain MPDCCHs to combine when attempting to decode an MPDCCH. A UE may use the information regarding the bundling technique(s) to determine subframes containing MPDCCHs and combine signals received in the subframes before attempting to decode the MPDCCH.

A UE receiving an MPDCCH time division multiplexed using non-continuous bundles (e.g., as illustrated in exemplary technique 930 in FIG. 9 above) may correctly decode an MPDCCH without waiting to receive the entire bundle. This may happen in situations when a transmitting BS is configured to support a CE level higher than the CE level under which the receiving UE is operating. For example, a BS supporting a CE level of 15 dB may bundle each MPDCCH in ten subframes. In the example, a receiving UE that is in good signal conditions and operating under a CE level of 0 dB may decode an MPDCCH after receiving a first subframe of the ten-subframe bundle.

Figure 10:
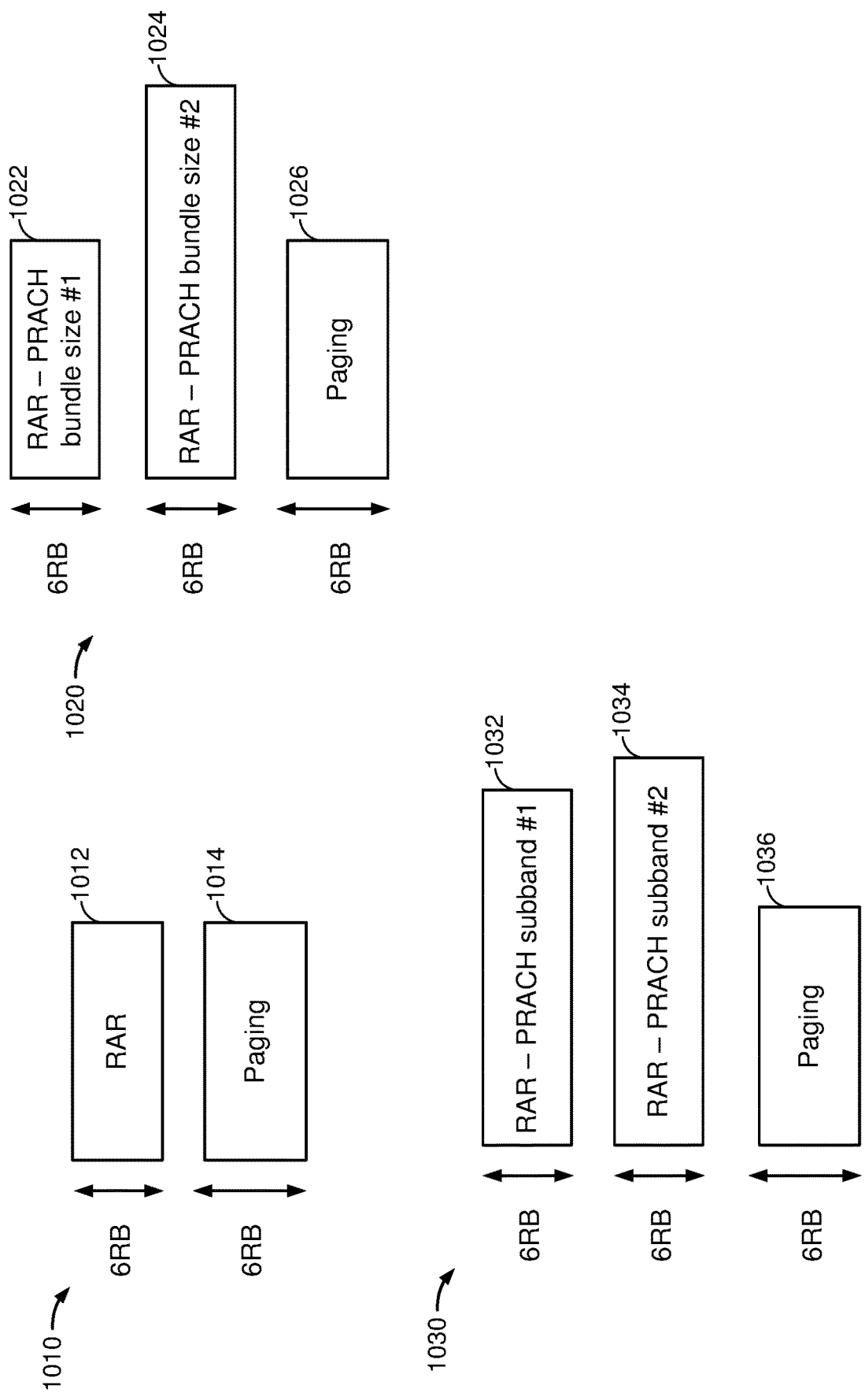
FIG. 10 illustrates exemplary MPDCCH common search spaces, in accordance with certain aspects of the present disclosure.

FIG. 10 illustrates exemplary techniques 1010, 1020, and 1030 for configuring MPDCCH common search space for MPDCCHs conveying paging signals and one or more MPDCCH common search spaces for MPDCCHs conveying RAR messages, according to aspects of the present disclosure described above. In exemplary technique 1010, an MPDCCH common search space 1012 for MPDCCHs conveying RAR messages is configured on a first narrowband region and an MPDCCH common search space 1014 for MPDCCHs conveying paging signals is configured on a second narrowband region.

In exemplary technique 1020, a first MPDCCH common search space 1022 for MPDCCHs conveying RAR messages is configured on a first narrowband region, a second MPDCCH common search space 1024 for MPDCCHs conveying RAR messages is configured on a second narrowband region, and an MPDCCH common search space 1026 for MPDCCHs conveying paging signals is configured on a third narrowband region. The first MPDCCH common search space 1022 for MPDCCHs conveying RAR messages is used to respond to PRACH signals of bundle size #1, while the second MPDCCH common search space 1024 for MPDCCHs conveying RAR messages is used to respond to PRACH signals of bundle size #2. The technique shows two MPDCCH common search spaces for MPDCCHs conveying RAR messages, but the disclosure is not so limited and may be used with more MPDCCH common search spaces.

In exemplary technique 1030, a first MPDCCH common search space 1032 for MPDCCHs conveying RAR messages is configured on a first narrowband region, a second MPDCCH common search space 1034 for MPDCCHs conveying RAR messages is configured on a second narrowband region, and an MPDCCH common search space 1036 for MPDCCHs conveying paging signals is configured on a third narrowband region, similar to exemplary technique 1020. The first MPDCCH common search space 1032 for MPDCCHs conveying RAR messages is used to respond to PRACH signals received on narrowband region or subband #1, while the second MPDCCH common search space 1034 for MPDCCHs conveying RAR messages is used to respond to PRACH signals received on narrowband region or subband #2. The technique shows two MPDCCH common search spaces for MPDCCHs conveying RAR messages, but the disclosure is not so limited and may be used with more MPDCCH common search spaces.

According to aspects of the present disclosure, a BS serving MTC UEs may be configured to transmit MPDCCHs conveying paging signals in a first MPDCCH common search space and MPDCCHs conveying RAR messages in a second MPDCCH common search space in first and second narrowband regions of a wider system bandwidth (e.g., as in exemplary technique 1010 in FIG. 10 above).

A BS may be configured with a plurality of MPDCCH common search spaces for MPDCCHs conveying RAR messages. The BS may determine which MPDCCH common search space to use for transmitting a RAR message based on the PRACH signal to which the RAR message is responsive (e.g., as in technique 1020 in FIG. 10 above). The BS may determine to transmit a RAR message in a first MPDCCH common search space if the BS received a PRACH signal bundled in x (e.g., two) or fewer subframes (corresponding to a CE level of y or less for the transmitting UE), and the BS may determine to transmit the RAR message in a second MPDCCH common search space if the BS received a PRACH signal bundled in x+1 (e.g., three) or more subframes (corresponding to a CE level more than y for the transmitting UE). A BS configured with more than two MPDCCH common search spaces for conveying RAR messages may be configured to use each MPDCCH common search space for responding to PRACH signals in different PRACH signal bundle size ranges.

Additionally or alternatively, a BS configured with a plurality of MPDCCH common search spaces for conveying RAR messages may determine which MPDCCH common search space to use for transmitting a RAR message based on a subband used for transmitting the PRACH signal to which the RAR message is responsive (e.g., as in technique 1030 in FIG. 10 above). The BS may determine to transmit a RAR message in a first MPDCCH common search space if the BS received a PRACH signal on a first narrowband region or subband, and the BS may determine to transmit the RAR message in a second MPDCCH common search space if the BS received a PRACH signal on a second narrowband region or subband. A BS configured with more than two MPDCCH common search spaces for conveying RAR messages may be configured to use each MPDCCH common search space for responding to PRACH signals in a different narrowband region.

According to aspects of the present disclosure, a BS may transmit information regarding which MPDCCH common search space the BS will use for transmitting MPDCCHs conveying RAR messages based on the bundle size or CE level of the PRACH signal to which the RAR message is responsive. That is, a BS may transmit a signal indicating that PRACH signals of a first bundle size or first CE level or smaller will be responded to (by the BS) with RAR messages in a first MPDCCH common search space, and PRACH signals of a bundle size larger than the first bundle size or CE level larger than the first CE level will be responded to with RAR messages in a second MPDCCH common search space. The information may be transmitted, for example, in a system information block (SIB). If a BS is configured with more than two MPDCCH common search spaces for more than two bundle sizes or CE levels, the BS may transmit information regarding all of the MPDCCH common search spaces, bundle size thresholds, and CE level thresholds.

According to aspects of the present disclosure, an MTC UE may be configured with a first MPDCCH common search space in a first narrowband region for MPDCCHs conveying RAR messages (e.g., as in operation 800 in FIG. 8 above). The MTC UE may transmit a PRACH signal to a BS on a second narrowband region. The UE may receive an MPDCCH conveying a RAR message from the BS in the first MPDCCH common search space. The UE may receive information regarding the first MPDCCH common search space for MPDCCHs conveying RAR messages in a system information block (SIB).

According to some aspects of the present disclosure, a UE may receive an MPDCCH conveying a paging signal multiplexed (e.g., as in technique 910 in FIG. 9 above) with the MPDCCH conveying the RAR message in the first MPDCCH common search space in at least one subframe.

A UE may receive an MDPCCH conveying a paging signal in the first MPDCCH common search space in another subframe (e.g., as in technique 920 in FIG. 9 above). According to aspects of the present disclosure, the MPDCCH conveying the RAR message may be bundled in non-continuous subframes and the MPDCCH conveying the paging signal may be bundled in non-continuous subframes (e.g., as in technique 930 in FIG. 9 above).

An MTC UE may be configured with a first MPDCCH common search space for MPDCCHs conveying paging signals and a second MPDCCH common search space for MPDCCHs conveying RAR messages (e.g., as in technique 1010 in FIG. 10 above). The first and second MPDCCH common search spaces may each be within different narrowband regions of a wider system bandwidth.

An MTC UE may identify a third MPDCCH common search space for MPDCCHs conveying RAR messages (e.g., as in technique 1020 in FIG. 10 above). The UE may determine to monitor the second MPDCCH common search space for MPDCCHs conveying RAR messages or the third MPDCCH common search space for MPDCCHs conveying RAR messages based on a coverage enhancement (CE) level of the UE. The UE may receive information regarding the second MPDCCH common search space for MPDCCHs conveying RAR messages and the corresponding CE level in a system information block (SIB). The UE may also receive information regarding the third MPDCCH common search space for MPDCCHs conveying RAR messages and the corresponding CE level in a SIB.

An MTC UE may identify a third MPDCCH common search space for MPDCCHs conveying RAR messages (e.g., as in technique 1030 in FIG. 10 above). The UE may determine to monitor the second MPDCCH common search space for MPDCCHs conveying RAR messages or the third MPDCCH common search space for MPDCCHs conveying RAR messages based on the narrowband region or subband used for transmitting the PRACH signal. The UE may receive information regarding the second MPDCCH common search space for MPDCCHs conveying RAR messages and the corresponding PRACH subband in a system information block (SIB). The UE may also receive information regarding the third MPDCCH common search space for MPDCCHs conveying RAR messages and the corresponding PRACH subband in a SIB.

A BS may determine whether to multiplex MPDCCHs conveying paging signals and MPDCCHs conveying RAR messages in the same subframes in one MPDCCH common search space as illustrated in technique 910 shown in FIG. 9, or to transmit MPDCCHs conveying paging signals and MPDCCHs conveying RAR messages using other techniques. A BS supporting only low CE levels or bundle sizes may determine to multiplex MPDCCHs conveying paging signals and MPDCCHs conveying RAR messages. A BS supporting higher CE levels (e.g., 15 dB) or bundle sizes (e.g., 10 subframes) may determine to time division multiplex MPDCCHs conveying paging signals and MPDCCHs conveying RAR messages as illustrated in technique 920 shown in FIG. 9. Alternatively the BS supporting the higher CE levels or bundle sizes may determine to transmit MPDCCHs conveying paging signals in a first MPDCCH common search space and to transmit MPDCCHs conveying RAR messages in one or more other MPDCCH common search spaces as in techniques 1020 and 1030 shown in FIG. 10.

According to aspects of the present disclosure, a BS may transmit an indication of a RAR response window for each of a plurality of CE levels. A RAR response window is a period of time that a UE should monitor for RAR messages after transmitting a PRACH signal before determining that the UE should transmit a PRACH signal. A BS may transmit an indication of a RAR offset number of subframes or RAR response window for each of the plurality of CE levels. A RAR offset is a period of time that a UE should wait after finishing PRACH transmission before beginning monitoring for RAR messages for the RAR response window. An MTC UE may have a RAR offset longer than a standard UE due, for example, to retuning time or half duplex capability.

A BS may transmit an indication of a set of MPDCCH starting point subframes for each of the plurality of CE levels. The set of MPDCCH starting point subframes are the subframes in which the BS may begin transmitting an MPDCCH (e.g., the first subframe of a bundle of subframes). A BS may transmit an indication of a bundle size for each of the plurality of CE levels.

According to aspects of the present disclosure, a BS may determine a radio frequency for paging, a time for paging, and a bundle size for MPDCCHs conveying paging signals, based on a maximum CE level supported by the BS.

According to aspects of the present disclosure, a BS may transmit a system information (SI) change or earthquake and tsunami warning system (ETWS) signal in a broadcast channel of the wider system bandwidth. The BS may transmit the same SI change or ETWS signal in dedicated signaling to one or more MTC UEs in narrowband regions, because connected mode (e.g., not idle mode) UEs may not monitor the broadcast channels of the wider system bandwidth.

According to aspects of the present disclosure, an MTC UE that is in connected mode may periodically tune away from the narrowband region assigned to the MTC UE and tune to the broadcast region of the wider system bandwidth. A BS supporting the MTC UE may determine time periods that the MTC UE tunes away from the narrowband region assigned to the MTC UE and refrain from transmitting any dedicated channels to the UE. The BS may transmit a system information (SI) change or earthquake and tsunami warning system (ETWS) signal to the MTC UE in a broadcast channel of the wider system bandwidth in time periods that the MTC UE has tuned away from the narrowband region assigned to the MTC UE to improve the probability that the MTC UE will receive the SI change and/or the ETWS signal.

According to aspects of the present disclosure, a BS serving a UE (e.g., an MTC UE) with the UE in connected mode (e.g., connected DRX mode) may cause the UE to transition to a disconnected mode. The BS may cause the UE to transition to a disconnected mode by, for example, sending an explicit command to disconnect or by refraining from responding to transmissions from the UE, which may cause the UE to declare a radio link failure (RLF) and disconnect from the BS. The BS may cause the UE to transition to a disconnected mode so that the UE may monitor paging channels to receive notifications of an SI change and/or an ETWS signal.

Figure 11:
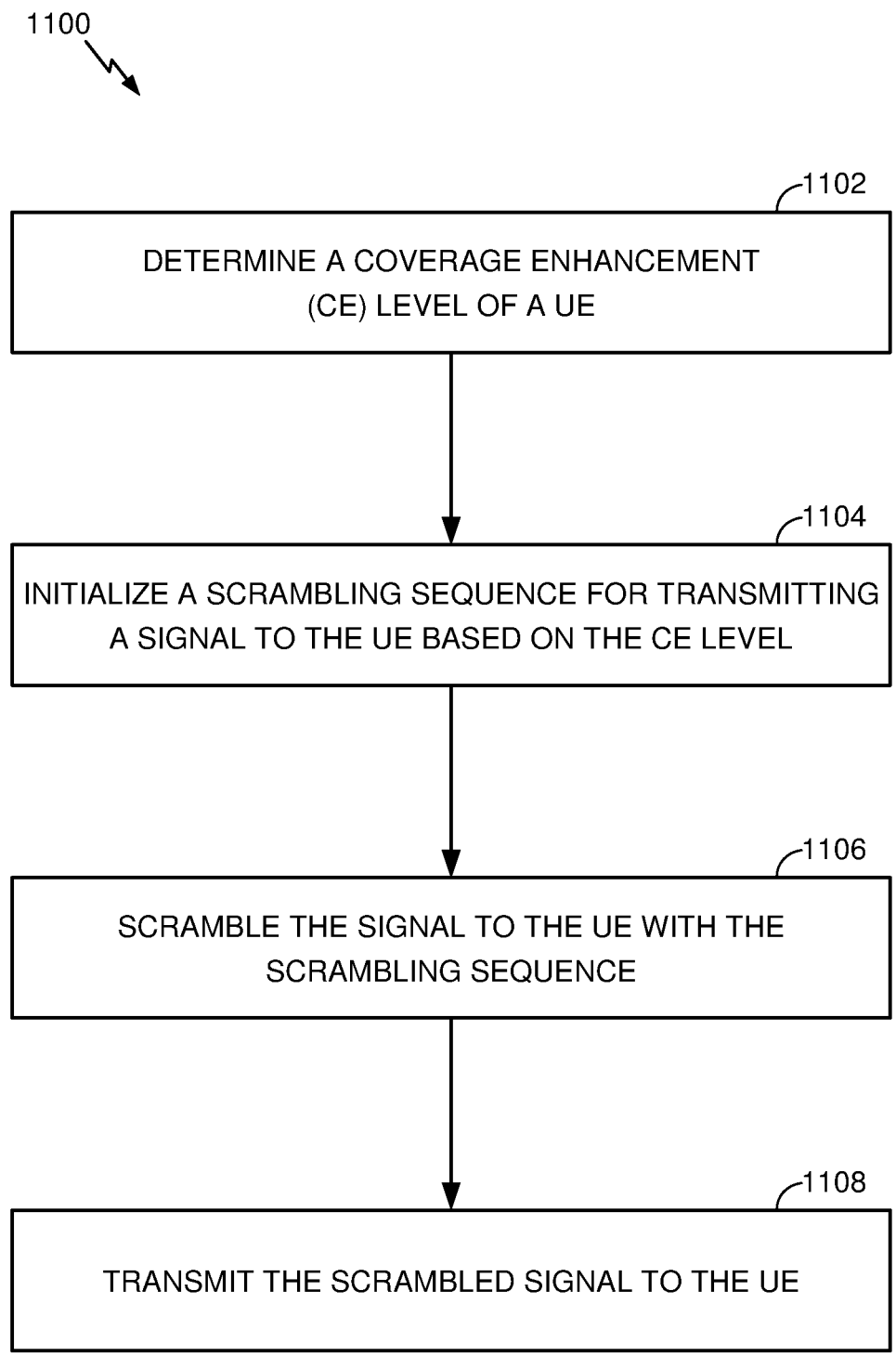
FIG. 11 illustrates an exemplary operation for wireless communications that may be performed by a BS, in accordance with certain aspects of the present disclosure.

FIG. 11 illustrates example operation 1100 for wireless communications that may be performed by a BS (e.g., eNodeB 110*a* in FIG. 1), according to aspects of the present disclosure. The operation 1100 may be performed by a BS to scramble transmissions to and otherwise support MTC UEs.

Operation 1100 begins at block 1102, wherein the BS determines a coverage enhancement (CE) level of a UE. Operation 1100 continues at block 1104, wherein the BS initializes a scrambling sequence for transmitting a signal to the UE based on the CE level. At block 1106, the BS scrambles the signal to the UE with the scrambling sequence. At block 1108, operation 1100 continues with the BS transmitting the scrambled signal to the UE.

Figure 12:
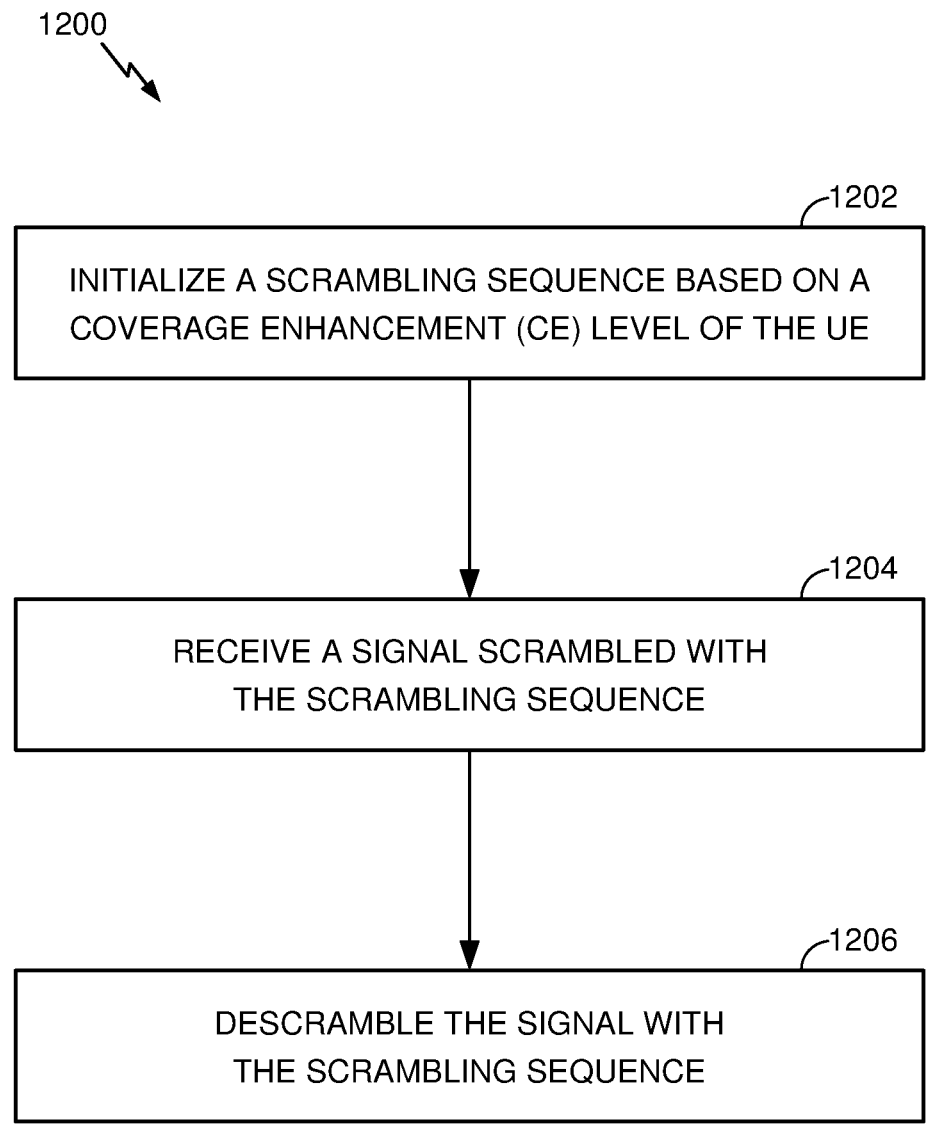
FIG. 12 illustrates an exemplary operation for wireless communications that may be performed by a UE, in accordance with certain aspects of the present disclosure.

FIG. 12 illustrates example operation 1200 for wireless communications that may be performed by a UE (e.g., UE 120*a* in FIG. 1), according to aspects of the present disclosure. The operation 1200 may be performed by an MTC UE to descramble an MPDCCH, for example. The operation 1200 may be considered complementary to the operation 1100 in FIG. 11 described above.

Operation 1200 begins at block 1202, wherein the UE initializes a scrambling sequence based on a coverage enhancement (CE) level of the UE. Operation 1200 continues at block 1204, wherein the UE receives a signal scrambled with the scrambling sequence. At block 1206, the UE descrambles the signal with the scrambling sequence.

Figure 13:
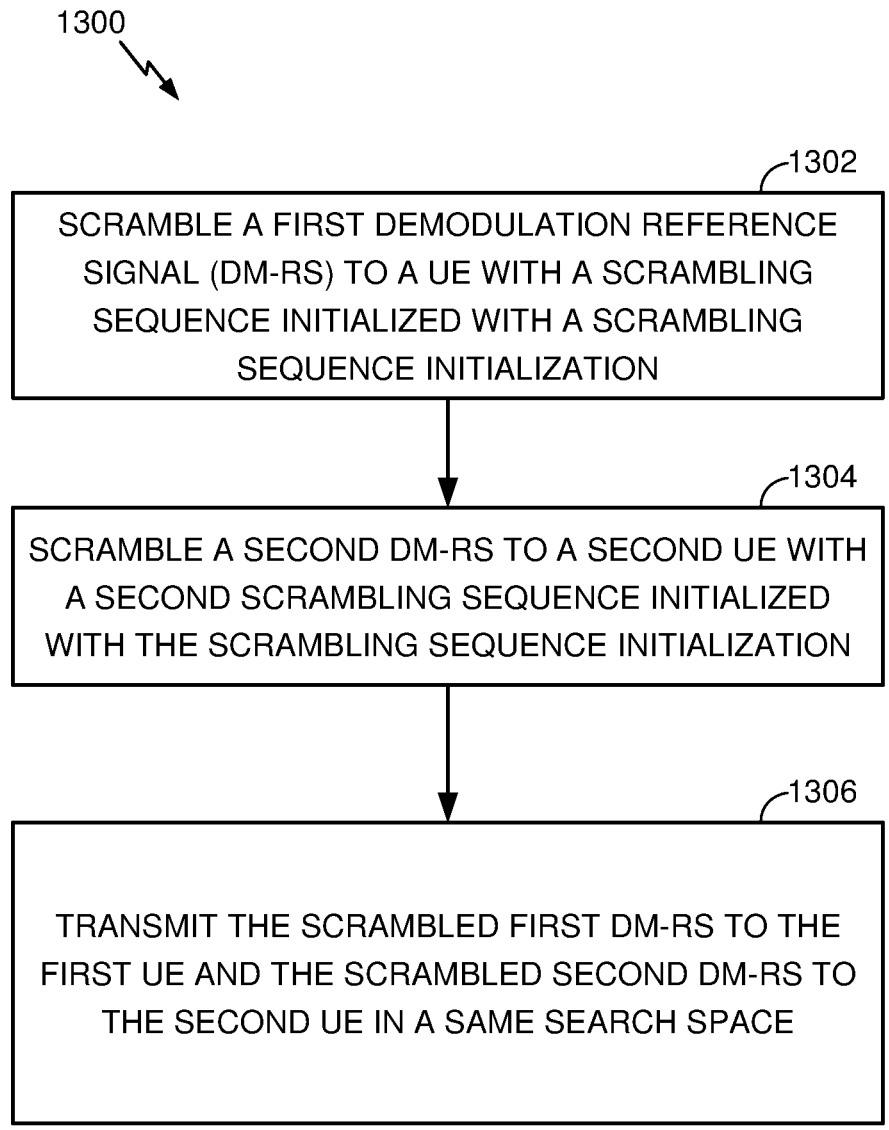
FIG. 13 illustrates an exemplary operation for wireless communications that may be performed by a BS, in accordance with certain aspects of the present disclosure.

FIG. 13 illustrates example operation 1300 for wireless communications that may be performed by a BS (e.g., eNodeB 110*a* in FIG. 1), according to aspects of the present disclosure. The operation 1300 may be performed by a BS to scramble transmissions to and otherwise support MTC UEs.

Operation 1300 begins at block 1302, wherein the BS scrambles a first demodulation reference signal (DM-RS) to a first UE with a scrambling sequence initialized with a scrambling sequence initialization. Operation 1300 continues at block 1304, wherein the BS scrambles a second DM-RS to a second UE with a second scrambling sequence initialized with the scrambling sequence initialization. At block 1306, the BS transmits the scrambled first DM-RS to the first UE and the scrambled second DM-RS to the second UE in a same search space.

Figure 14:
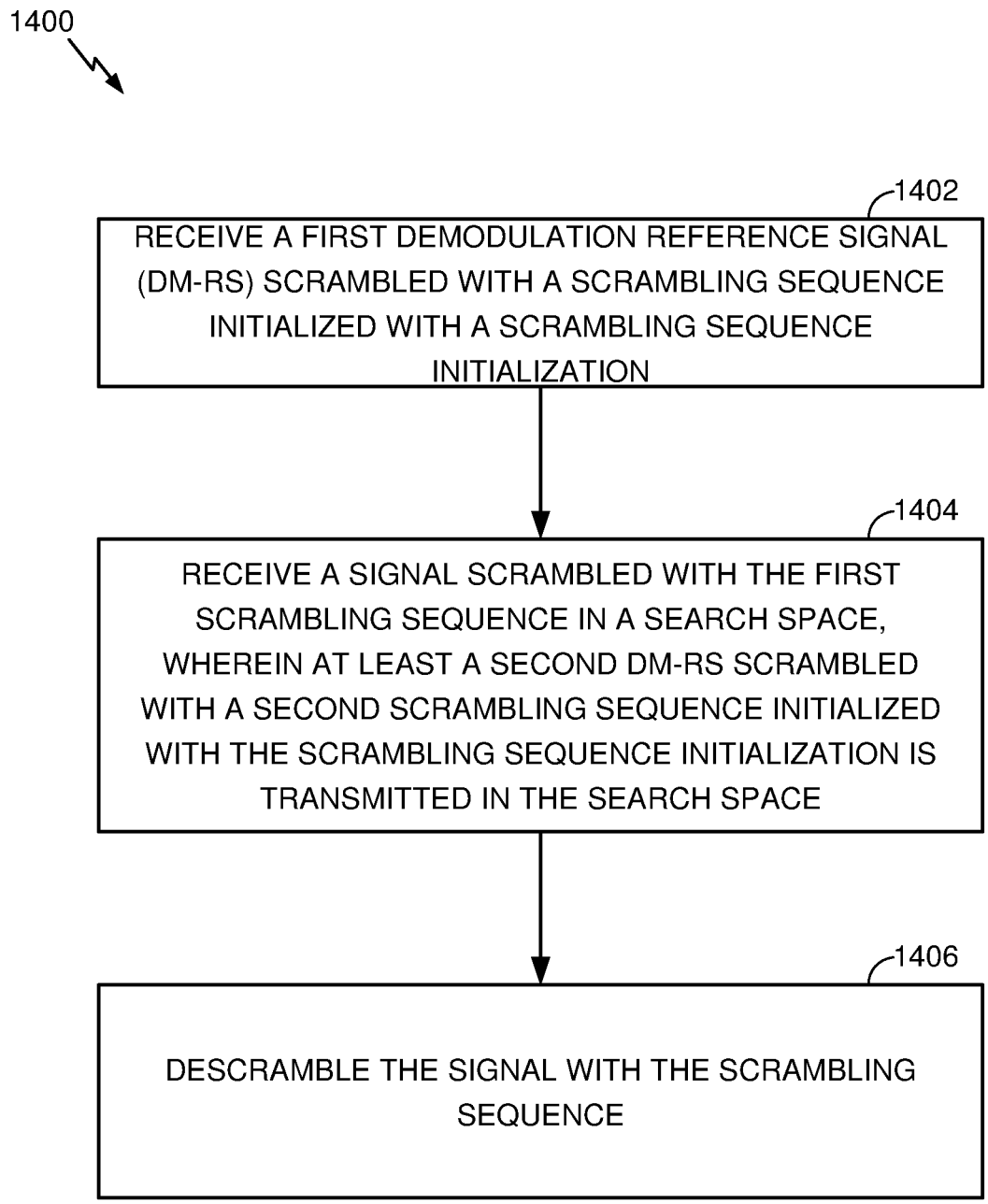
FIG. 14 illustrates an exemplary operation for wireless communications that may be performed by a UE, in accordance with certain aspects of the present disclosure.

FIG. 14 illustrates example operation 1400 for wireless communications that may be performed by a UE (e.g., UE 120*a* in FIG. 1), according to aspects of the present disclosure. The operation 1400 may be performed by an MTC UE to descramble an MPDCCH, for example. The operation 1400 may be considered complementary to the operation 1300 in FIG. 13 described above.

Operation 1400 begins at block 1402, wherein the UE receives a first demodulation reference signal (DM-RS) scrambled with a scrambling sequence initialized with a scrambling sequence initialization. Operation 1400 continues at block 1404, wherein the UE receives a signal scrambled with the first scrambling sequence in a search space, wherein at least a second DM-RS scrambled with a second scrambling sequence initialized with the scrambling sequence initialization is transmitted in the search space. At block 1406, the UE descrambles the signal with the scrambling sequence.

According to aspects of the present disclosure, a BS supporting MTC UEs may use a fixed scrambling ID when scrambling MPDCCHs (e.g., as in operation 1100 in FIG. 11 above) or MPDCCH associated reference signals (e.g., DM-RS) to be transmitted in an MPDCCH common search space. The scrambling ID is fixed so that all UEs receiving the MPDCCH may be able to descramble the MPDCCH. The fixed scrambling ID may be transmitted in a SIB (e.g., SIB1).

Scrambling of MPDCCHs may be similar to scrambling of EPDCCHs as described in 3GPP TS 36.213 "Evolved Universal Terrestrial Radio Access (E-UTRA); Physical layer procedures" and 3GPP TS 36.211 "Evolved Universal Terrestrial Radio Access (E-UTRA); Physical Channels and Modulation," which are publicly available and hereby incorporated by reference. The variable $Y_{p,k}$ used to determine the MPDCCH decoding candidates is initialized with either the paging radio network temporary identifier (P-RNTI) or the random access radio network temporary identifier (RA-RNTI), depending on whether the MPDCCH conveys a paging signal or a RAR message. In some cases, the MPDCCH decoding candidates may be determined by the maximum coverage enhancement level supported by a BS, which may be signaled in a SIB1 transmitted by the BS. As noted above, the scrambling ID $n^{MPDCCH}_{SCID}$ is fixed for all UEs served by a cell. In order to improve randomization between EPDCCH and MPDCCH, the scrambling ID may be set to 3, which differs from the scrambling ID for EPDCCH $n^{EPDCCH}_{ID,m}$ that is typically set to 2. The scrambling initialization for MPDCCH is then:

$$c_{init}=(\lfloor n_s/2 \rfloor+1)\cdot(2n^{EPDCCH}_{ID,i}+1)\cdot 2^{16}+n^{MPDCCH}_{SCID}$$

The scrambling ID can depend on the CE levels of UEs being signaled. For example, a BS may use $n^{MPDCCH}_{SCID}=2$ as the scrambling ID when signaling UEs that are operating without CE or with small CE (e.g., CE level of 0 dB) and the BS may use 3 as the scrambling ID when signaling UEs that are operating with a larger CE (e.g., CE level of 10 dB).

A scrambling sequence initialization may be cell-specific, according to aspects of the present disclosure. That is, a BS may use a scrambling sequence initialization for scrambling all MPDCCHs to UEs in a cell, while other BSs may use other scrambling sequence initializations for scrambling MPDCCHs to UEs served in other cells.

According to aspects of the present disclosure, the scrambling sequence may comprise a demodulation reference signal (DM-RS).

According to aspects of the present disclosure, a BS may transmit a scrambled signal to an enhanced machine type communications (eMTC) UE multiplexed with a scrambled signal to a non-eMTC UE in a same resource block.

According to aspects of the present disclosure, a UE may receive a scrambled signal from a BS, initialize a scrambling sequence based on a CE level of the UE, and descramble the scrambled signal with the scrambling sequence (e.g., as in operation 1200 in FIG. 12 above). The scrambled sequence may comprise a DM-RS. Another signal may be multiplexed with the scrambled signal in a same resource block.

According to aspects of the present disclosure, a UE may monitor MPDCCH of different repetition levels for the reception of a paging channel. For example, the eNB may transmit MPDCCHs related to paging with repetition levels R selected from the set {1, 4, 32, 256}. The large variability in numbers of repetition of MPDCCHs allows an eNB to accommodate UEs with widely varying coverage levels. In some cases, a UE in good coverage may need to monitor only the lower repetition levels (e.g., R∈{1,4}), and if the eNB transmits with a larger repetition level the UE may early decode. For example, if eNB transmits with R=32, the UE may be able to early decode with a lower number of repetitions (e.g., R=8). That is, while the eNB transmits the MPDCCH 32 times (repetition level 32) in the example, the UE may correctly decode the MPDCCH after the eighth repetition, and the UE may deactivate a receiver after the eighth repetition, thus conserving power. It may be important for a UE to correctly assess the repetition levels to monitor to reduce power consumption of the UE while keeping good reliability in communications.

According to aspects of the present disclosure, a BS (e.g., the BS mentioned in FIG. 7 and/or FIG. 15) may determine a set of repetitions for transmitting a downlink channel, based at least in part on a coverage enhancement (CE) level of a UE, determine a power boost value for the downlink channel, transmit an indication of the power boost value for the downlink channel, and transmit the downlink channel based on the set of repetitions and the power boost value. The BS may determine different power boost values for at least one repetition in the set of repetitions. That is, a BS may determine how much to power boost a channel to a UE and how many repetitions to use based on information of the CE level of the UE, and then the BS may transmit the channel (e.g., an MPDCCH) to the UE for the determined number of repetitions, with each repetition power boosted one of the determined amounts.

In some cases, assessment of the repetition levels to monitor by a UE may be made based on measured received signal quality. For example, a UE may measure downlink RSRP, RSRQ, and/or signal to noise ratio (SNR) based on a cell-specific reference signal, and the UE may decide the repetition level to monitor for paging based at least in part on this measurement. According to aspects of the present disclosure, a UE may determine a necessary repetition level to decode MPDCCHs up to a certain reliability (e.g., a 1% missed detection rate) and select to monitor a lowest repetition level from a set of repetition levels that meets that requirement. For example, a UE may have a reliability requirement to receive MPDCCHs with a rate of missed detections of 1%, determine that repetition levels of 32 and 256 both meet that requirement, and select to monitor for MPDCCHs at a repetition level of 32 because it is lower than the repetition level of 256.

In some cases, MPDCCHs for paging may be power boosted to reduce decoding time for a UE in deep coverage. When MPDCCHs for paging are power boosted, the UE may take into account a power boost value of MPDCCHs when assessing a repetition level or levels to monitor. The UE may determine a necessary repetition level to decode MPDCCHs up to a certain reliability (e.g., 1% miss detection rate) and pick the lowest repetition level that meets that requirement while taking into account the power boost value of the MPDCCHs. For example, if a UE determines a SNR value for signals from an eNB is −5 dB, and the power boost value for MPDCCHs for paging is 3 dB, then the UE may determine to monitor MPDCCHs using a repetition level based on an effective SNR value of −5+3=−2 dB. The power boost value used by an eNB may be broadcast by the eNB in system information, communicated to a UE in a unicast manner (e.g. by RRC message), or conveyed by higher layer signaling. Furthermore, different repetition levels may have different power boost values, so the eNB may determine and transmit indications of a set of power boost values corresponding to each (or a subset) of the repetition levels, and a UE may determine a subset of the repetition levels or a maximum repetition level based at least in part on a measured received signal quality and the indicated set of power boost values. As above, the eNB may broadcast the indications of the set of power boost values, transmit the indications in a unicast manner, or convey the indications by higher layer signaling.

According to aspects of the present disclosure, a UE (e.g., the UE mentioned in FIG. 8) may receive a paging signal in a second search space in a third narrowband region. That is, a UE may transmit a PRACH signal on a first narrowband region, receive a RAR message responding to the PRACH on a second narrowband region, and receive a paging signal in another search space in third narrowband region.

According to aspects of the present disclosure, a UE (e.g., the UE mentioned in FIG. 8 and/or FIG. 15) may determine a first set of repetitions for receiving a downlink channel, based at least in part on a maximum coverage enhancement (CE) level supported by the BS, determine a received signal quality, determine a second set of repetitions for receiving the downlink channel based at least in part on the first set of repetitions and the received signal quality, and receive the downlink channel based on the second set of repetitions. The UE may further receive an indication of a power boost value for the downlink channel and determine the second set of repetitions for receiving the downlink channel further based on the indication of the power boost value. The indication of the power boost value for the downlink channel may indicate different power boost values for different repetitions in the first set of repetitions. Additionally or alternatively, the downlink channel may be a control channel associated with a paging channel. Also additionally or alternatively, the UE may move to a discontinuous reception (DRX) mode if the UE does not receive the downlink channel.

Figure 15:
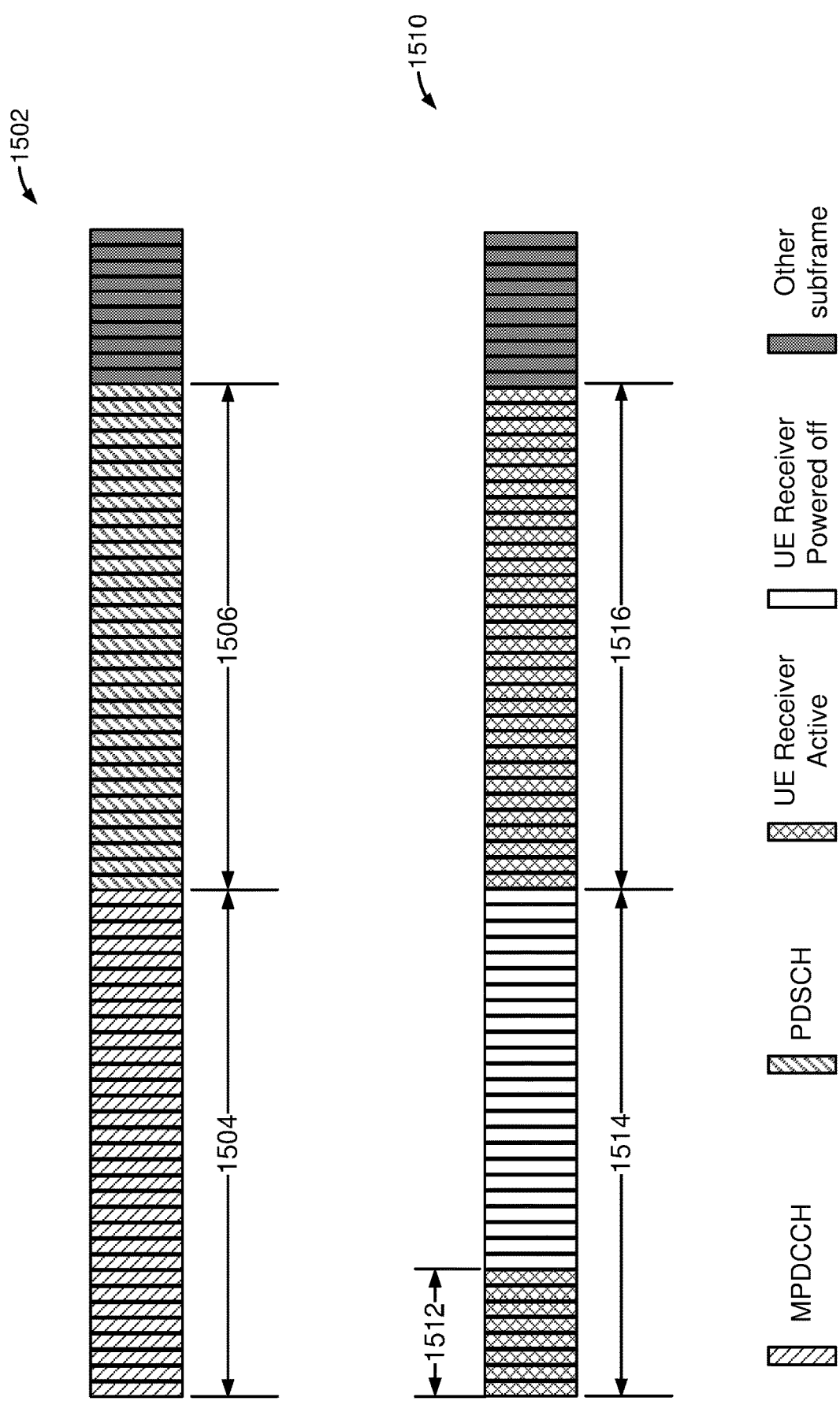
FIG. 15 illustrates an exemplary transmission timelines of a BS and a UE operating according to aspects of the present disclosure.

FIG. 15 illustrates an exemplary transmission timeline 1502 of a BS (e.g., eNB 110a shown in FIG. 1) and an exemplary transmission timeline 1510 of a UE (e.g., UE 120a shown in FIG. 1) operating according to aspects of the present disclosure. The UE may be an MTC UE, as previously described. In the exemplary timelines 1502 and 1510, each block represents one subframe. During the time 1504, the BS transmits an MPDCCH at a repetition level of 32. The MPDCCH may be, for example, scheduling a PDSCH directed to an MTC UE, such as UE 120a shown in FIG. 1. The MPDCCH may be power boosted, as described previously above. In the example timelines, the MPDCCH is power boosted, and the MTC UE receives and successfully decodes the MPDCCH in eight subframes during the time shown at 1512. The MTC UE has information regarding the repetition level used by the BS, and powers off a receiver of the MTC UE for the remaining portion of the time 1514, as illustrated by the unfilled boxes. During the time 1506, the BS transmits the PDSCH scheduled by the MPDCCH to the MTC UE. During the time 1516, the UE activates the receiver of the UE and receives and decodes the PDSCH. As illustrated, the MTC UE may keep the receiver active for the 32 subframes of the repetition level, if needed, to successfully receive the PDSCH.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The steps of a method or algorithm described in connection with the disclosure herein may be embodied directly in hardware, in a software module executed by a processor, or in a combination of the two. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A software module may reside in RAM memory, flash memory, ROM memory, EPROM memory, EEPROM memory, PCM (phase change memory), registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering.

In one or more exemplary designs, the functions described may be implemented in hardware, software or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a user equipment (UE), comprising:
    monitoring for a downlink channel transmission in a first narrowband region comprising one to six resource blocks (RBs) within a wider downlink (DL) system bandwidth, wherein the downlink channel transmission comprises a paging signal and is over a set of repetitions;
    determining a radio frequency within the wider DL system bandwidth for paging based at least on a maximum coverage enhancement (CE) level supported by a base station or a bundle size indicating the set of repetitions for the downlink channel transmission comprising the paging signal based at least on the maximum CE level; and
    moving to a discontinuous reception mode (DRX) if the downlink channel transmission comprising the paging signal is not received over the set of repetitions.

2. The method of claim 1, wherein the downlink channel transmission is received on a downlink control channel or a downlink shared channel.

3. The method of claim 1, further comprising determining a time for paging.

4. The method of claim 1, wherein the determining is based on a system information block (SIB).

5. An apparatus for wireless communications by a user equipment (UE), comprising:
    a memory comprising instructions; and
    one or more processors configured, individually or in any combination, to execute the instructions and cause the apparatus to:
        monitor for a downlink channel transmission in a first narrowband region comprising one to six resource blocks (RBs) within a wider downlink (DL) system bandwidth, wherein the downlink channel transmission comprises a paging signal and is over a set of repetitions;
        determine a radio frequency within the wider DL system bandwidth for paging based at least on a maximum coverage enhancement (CE) level supported by a base station or a bundle size indicating the set of repetitions for the downlink channel transmission comprising the paging signal based at least on the maximum CE level; and
        move to a discontinuous reception mode (DRX) if the downlink channel transmission comprising the paging signal is not received over the set of repetitions.

6. The apparatus of claim 5, wherein the downlink channel transmission is received on a downlink control channel or a downlink shared channel.

7. The apparatus of claim 5, wherein the one or more processors are configured, individually or in any combination, to execute the instructions and cause the apparatus to determine a time for paging.

8. The apparatus of claim 5, wherein the one or more processors are configured, individually or in any combination, to execute the instructions and cause the apparatus to determine the radio frequency or the bundle size based on a system information block (SIB).

9. A non-transitory computer readable medium for wireless communications by an apparatus, the computer readable medium including instructions that, when executed by at least one processor, cause the apparatus to perform operations comprising:
    monitoring for a downlink channel transmission in a first narrowband region comprising one to six resource blocks (RBs) within a wider downlink (DL) system bandwidth, wherein the downlink channel transmission comprises a paging signal and is over a set of repetitions;
    determining a radio frequency within the wider DL system bandwidth for paging based at least on a maximum coverage enhancement (CE) level supported by a base station or a bundle size indicating the set of repetitions for the downlink channel transmission comprising the paging signal based at least on the maximum CE level; and
    moving to a discontinuous reception mode (DRX) if the downlink channel transmission comprising the paging signal is not received over the set of repetitions.

10. The non-transitory computer readable medium of claim 9, wherein the downlink channel transmission is received on a downlink control channel or a downlink shared channel.

11. The non-transitory computer readable medium of claim 9, wherein the instructions, when executable by the at least one processor, cause the apparatus to perform further operations comprising determining a time for paging.

12. The non-transitory computer readable medium of claim 9, wherein the determining is based on a system information block (SIB).

* * * * *